US012598575B2

(12) United States Patent
Sun et al.

(10) Patent No.: US 12,598,575 B2
(45) Date of Patent: Apr. 7, 2026

(54) RANGING POLLS

(71) Applicant: QUALCOMM Incorporated, San Diego, CA (US)

(72) Inventors: Yanjun Sun, San Diego, CA (US); Alireza Raissinia, Monte Sereno, CA (US); George Cherian, San Diego, CA (US); Stephen Jay Shellhammer, Ramona, CA (US); Gaurang Naik, San Diego, CA (US); Abhishek Pramod Patil, San Diego, CA (US); Alfred Asterjadhi, San Diego, CA (US); Sai Yiu Duncan Ho, San Diego, CA (US); Abdel Karim Ajami, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 408 days.

(21) Appl. No.: 18/181,501

(22) Filed: Mar. 9, 2023

(65) Prior Publication Data

US 2024/0306114 A1     Sep. 12, 2024

(51) Int. Cl.
*H04W 64/00* (2009.01)
*H04W 4/02* (2018.01)
(Continued)

(52) U.S. Cl.
CPC ........... *H04W 64/00* (2013.01); *H04W 4/023* (2013.01); *H04W 24/10* (2013.01); *H04W 28/0278* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2019/0200383 A1* | 6/2019 | Jiang | H04W 64/00 |
| 2020/0191979 A1* | 6/2020 | Lindskog | G01S 5/0226 |

FOREIGN PATENT DOCUMENTS

WO     2022203168 A1     9/2022

OTHER PUBLICATIONS 802 11 Working Group of the LAN/MAN Standards Committee of the IEEE Computer Society: "Draft Standard for Information Technology—Tele-Communications and Information Exchange Between Systems Local and Metropolitan Area Networks—Specific Requirements, Part 11: Wireless LAN Medium Access Control and Physical Layer Specification, Amendment 8: Enhancements for Extremely High Throughput", Jan. 31, 2023, XP068196253, vol. 802.11be drafts, No. D3.0, pp. 1-999, par[9.3.1.22]-[9.3.1.22.5], par[9.3.1.22.9], par[9.3.3]-[9.3.3.10], par[35.3.17].

(Continued)

*Primary Examiner* — Adolf Dsouza
(74) *Attorney, Agent, or Firm* — Harrity & Harrity, LLP

(57)     ABSTRACT

Various aspects of the present disclosure generally relate to wireless communication. In some aspects, a responding station may transmit a first ranging poll via a first bandwidth, the first ranging poll comprising an indication of a second ranging poll and first polling information transmitted with repetitions in a frequency domain based at least in part on serving first initiating stations (I-STAs) configured for communication using the first bandwidth and second I-STAs configured for communication using a second bandwidth that is smaller than the first bandwidth. The responding station may transmit, based at least in part on the indication of the second ranging poll, the second ranging poll over the second bandwidth comprising second polling information. Numerous other aspects are described.

30 Claims, 11 Drawing Sheets

(51) Int. Cl.
    *H04W 24/10*      (2009.01)
    *H04W 28/02*      (2009.01)
    *H04W 84/12*      (2009.01)

(56)                References Cited

OTHER PUBLICATIONS

IEEE SA: "IEEE Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications Amendment 4: Enhancements for Positioning", IEEE Standard, IEEE, Piscataway, NJ, USA, Mar. 3, 2023, XP068200271, 248 Pages, paragraph [9.4.2.36], paragraph [9.4.2.297], paragraphs [11.21]-[11.21.6.4.3.2], paragraph [11.21.6.4.8.2].
International Search Report and Written Opinion—PCT/US2024/014803—ISA/EPO—May 21, 2024.

* cited by examiner

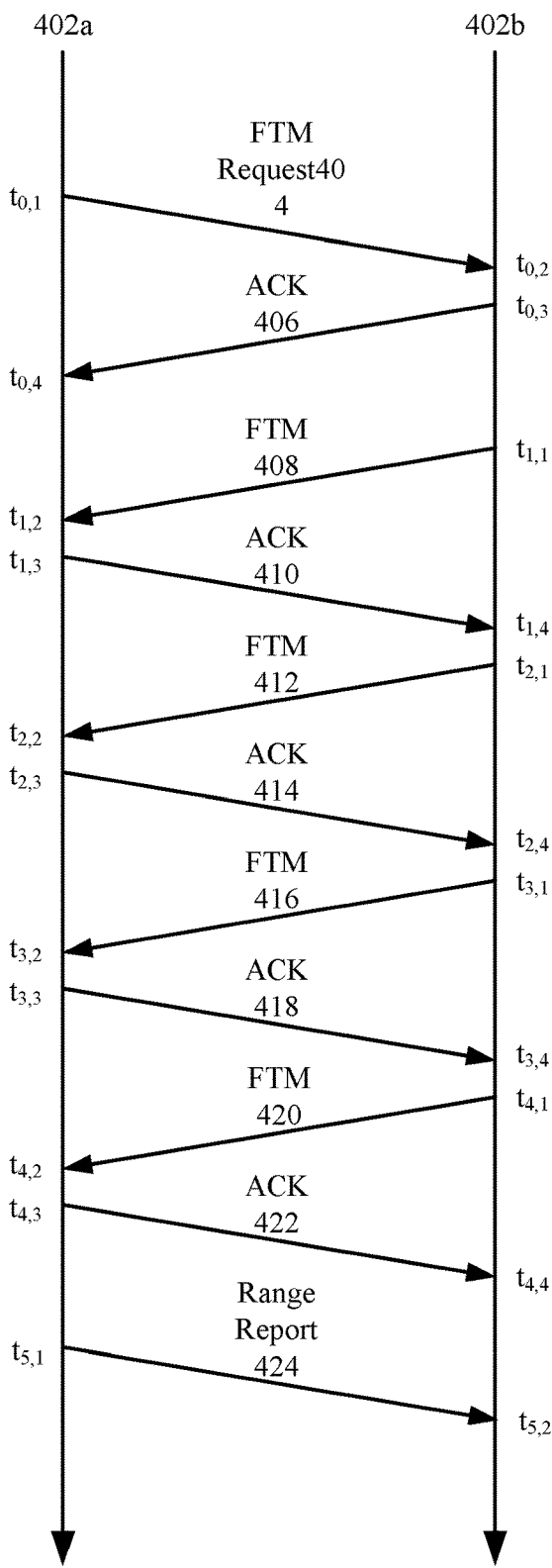
Fig. 4

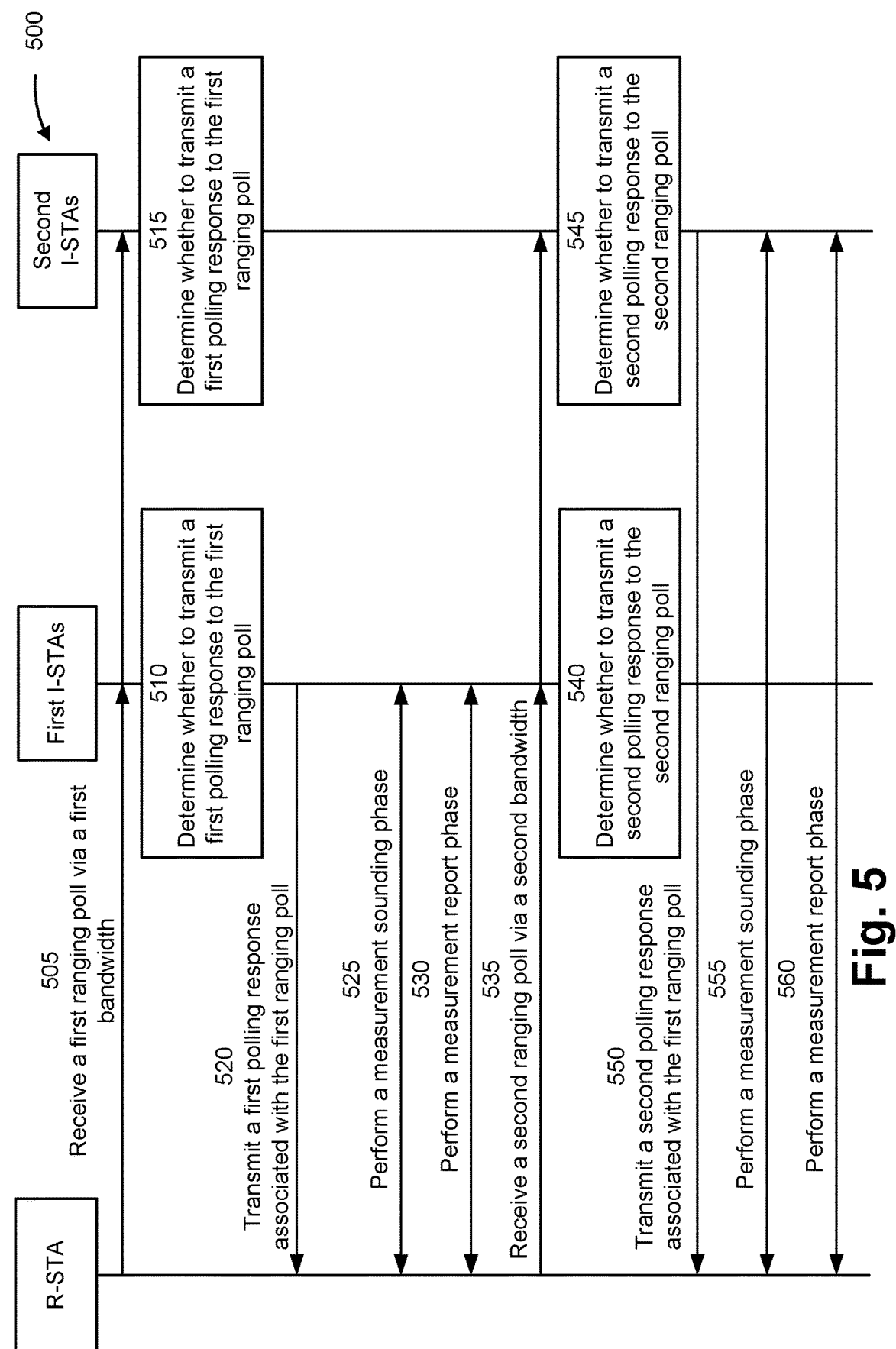

500

R-STA

First I-STAs

Second I-STAs

505 Receive a first ranging poll via a first bandwidth

510 Determine whether to transmit a first polling response to the first ranging poll 515 Determine whether to transmit a first polling response to the first ranging poll 520 Transmit a first polling response associated with the first ranging poll 525 Perform a measurement sounding phase 530 Perform a measurement report phase 535 Receive a second ranging poll via a second bandwidth 540 Determine whether to transmit a second polling response to the second ranging poll 545 Determine whether to transmit a second polling response to the second ranging poll 550 Transmit a second polling response associated with the first ranging poll 555 Perform a measurement sounding phase 560 Perform a measurement report phase

Fig. 5

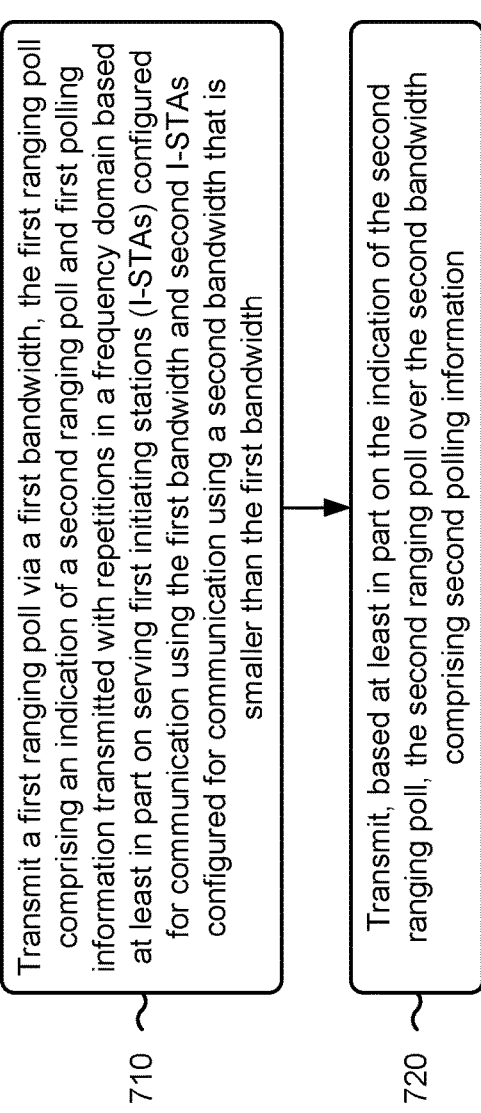

710 — Transmit a first ranging poll via a first bandwidth, the first ranging poll comprising an indication of a second ranging poll and first polling information transmitted with repetitions in a frequency domain based at least in part on serving first initiating stations (I-STAs) configured for communication using the first bandwidth and second I-STAs configured for communication using a second bandwidth that is smaller than the first bandwidth 720 — Transmit, based at least in part on the indication of the second ranging poll, the second ranging poll over the second bandwidth comprising second polling information

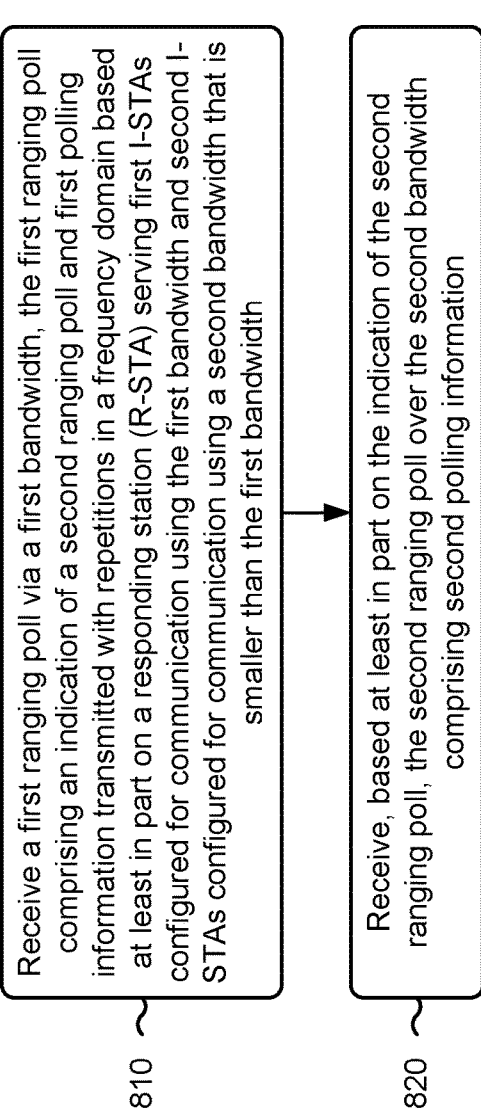

Receive a first ranging poll via a first bandwidth, the first ranging poll comprising an indication of a second ranging poll and first polling information transmitted with repetitions in a frequency domain based at least in part on a responding station (R-STA) serving first I-STAs configured for communication using the first bandwidth and second I-STAs configured for communication using a second bandwidth that is smaller than the first bandwidth

810

Receive, based at least in part on the indication of the second ranging poll, the second ranging poll over the second bandwidth comprising second polling information

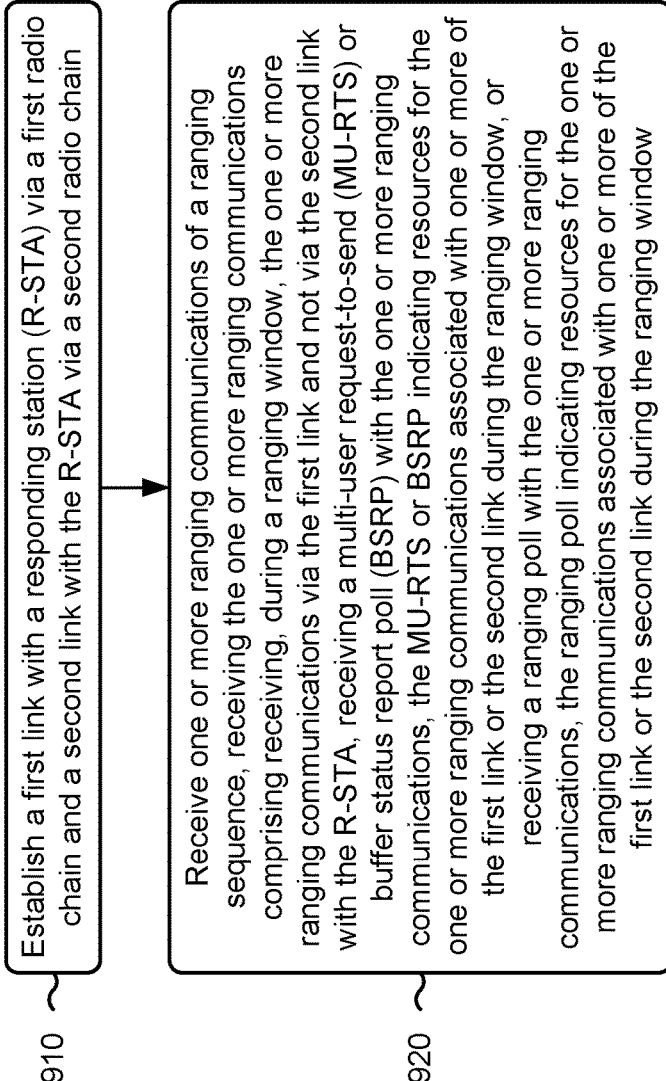

Establish a first link with a responding station (R-STA) via a first radio chain and a second link with the R-STA via a second radio chain

910

Receive one or more ranging communications of a ranging sequence, receiving the one or more ranging communications comprising receiving, during a ranging window, the one or more ranging communications via the first link and not via the second link with the R-STA, receiving a multi-user request-to-send (MU-RTS) or buffer status report poll (BSRP) with the one or more ranging communications, the MU-RTS or BSRP indicating resources for the one or more ranging communications associated with one or more of the first link or the second link during the ranging window, or receiving a ranging poll with the one or more ranging communications, the ranging poll indicating resources for the one or more ranging communications associated with one or more of the first link or the second link during the ranging window

RANGING POLLS

FIELD OF THE DISCLOSURE

Aspects of the present disclosure generally relate to wireless communication and specifically, to techniques and apparatuses for ranging polls.

BACKGROUND

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some WLANs, an AP may use a ranging procedure to identify locations of STAs within the WLAN. The STA may be associated with the AP or unassociated with the AP. In some of these WLANs, STAs within the WLAN may include high efficiency (HE) STAs and extremely high throughput (EHT) STAs. The EHT STAs may use a larger bandwidth for ranging than a smaller bandwidth supported by the HE STAs. In this case, the AP may use a ranging procedure with the smaller bandwidth, which may reduce accuracy and/or efficiency in comparison to the larger bandwidth, or may use a ranging procedure with the larger bandwidth, which may exclude the HE STAs. If using the ranging procedure with the larger bandwidth, a transmission opportunity or ranging window may be wasted if no EHT STAs respond and HE STAs are available, but unable to participate based at least in part on using the larger bandwidth.

In some WLANs, a STA may be an enhanced multi-link single radio (EMLSR) STA or an enhanced multi-link multi radio (EMLMR) STA. An EMLSR or EMLMR STA includes multiple radio chains that can be tuned to different bands for multi-layered communication. An AP may attempt to perform a ranging procedure with the EMLSR or EMLMR STA.

SUMMARY

The systems, methods, and devices of this disclosure each have several innovative aspects, no single one of which is solely responsible for the desirable attributes disclosed herein.

Some aspects described herein relate to a method of wireless communication performed by a responding station (R-STA). The method may include transmitting a first ranging poll via a first bandwidth, the first ranging poll comprising an indication of a second ranging poll and first polling information transmitted with repetitions in a frequency domain based at least in part on serving first initiating stations (I-STAs) configured for communication using the first bandwidth and second I-STAs configured for communication using a second bandwidth that is smaller than the first bandwidth. The method may include transmitting, based at least in part on the indication of the second ranging poll, the second ranging poll over the second bandwidth comprising second polling information.

Some aspects described herein relate to a method of wireless communication performed by an I-STA. The method may include receiving a first ranging poll via a first bandwidth, the first ranging poll comprising an indication of a second ranging poll and first polling information transmitted with repetitions in a frequency domain based at least in part on a R-STA serving first I-STAs configured for communication using the first bandwidth and second I-STAs configured for communication using a second bandwidth that is smaller than the first bandwidth. The method may include receiving, based at least in part on the indication of the second ranging poll, the second ranging poll over the second bandwidth comprising second polling information.

Some aspects described herein relate to a method of wireless communication performed by an I-STA. The method may include establishing a first link with a R-STA via a first radio chain and a second link with the R-STA via a second radio chain. The method may include receiving one or more ranging communications of a ranging sequence, receiving the one or more ranging communications comprising, receiving, during a ranging window, the one or more ranging communications via the first link and not via the second link with the R-STA, receiving a multi-user request-to-send (MU-RTS) or buffer status report poll (BSRP) with the one or more ranging communications, the MU-RTS or BSRP indicating resources for the one or more ranging communications associated with one or more of the first link or the second link during the ranging window, or receiving a ranging poll with the one or more ranging communications, the ranging poll indicating resources for the one or more ranging communications associated with one or more of the first link or the second link during the ranging window.

Some aspects described herein relate to a R-STA for wireless communication. The R-STA may include a memory and one or more processors coupled to the memory. The one or more processors may be configured to transmit a first ranging poll via a first bandwidth, the first ranging poll comprising an indication of a second ranging poll and first polling information transmitted with repetitions in a frequency domain based at least in part on serving first I-STAs configured for communication using the first bandwidth and second I-STAs configured for communication using a second bandwidth that is smaller than the first bandwidth. The one or more processors may be configured to transmit, based at least in part on the indication of the second ranging poll, the second ranging poll over the second bandwidth comprising second polling information.

Some aspects described herein relate to an I-STA for wireless communication. The I-STA may include a memory and one or more processors coupled to the memory. The one or more processors may be configured to receive a first ranging poll via a first bandwidth, the first ranging poll comprising an indication of a second ranging poll and first polling information transmitted with repetitions in a frequency domain based at least in part on a R-STA serving first I-STAs configured for communication using the first bandwidth and second I-STAs configured for communication using a second bandwidth that is smaller than the first bandwidth. The one or more processors may be configured to receive, based at least in part on the indication of the second ranging poll, the second ranging poll over the second bandwidth comprising second polling information.

Some aspects described herein relate to an I-STA for wireless communication. The I-STA may include a memory and one or more processors coupled to the memory. The one or more processors may be configured to establish a first link with a R-STA via a first radio chain and a second link with the R-STA via a second radio chain. The one or more processors may be configured to receive one or more ranging communications of a ranging sequence, reception of the one or more ranging communications comprising, reception, during a ranging window, of the one or more ranging communications via the first link and not via the second link with the R-STA, reception of an MU-RTS or BSRP with the one or more ranging communications, the MU-RTS or BSRP indicating resources for the one or more ranging communications associated with one or more of the first link or the second link during the ranging window, or reception of a ranging poll with the one or more ranging communications, the ranging poll indicating resources for the one or more ranging communications associated with one or more of the first link or the second link during the ranging window.

Some aspects described herein relate to a non-transitory computer-readable medium that stores a set of instructions for wireless communication by a R-STA. The set of instructions, when executed by one or more processors of the R-STA, may cause the R-STA to transmit a first ranging poll via a first bandwidth, the first ranging poll comprising an indication of a second ranging poll and first polling information transmitted with repetitions in a frequency domain based at least in part on serving first I-STAs configured for communication using the first bandwidth and second I-STAs configured for communication using a second bandwidth that is smaller than the first bandwidth. The set of instructions, when executed by one or more processors of the R-STA, may cause the R-STA to transmit, based at least in part on the indication of the second ranging poll, the second ranging poll over the second bandwidth comprising second polling information.

Some aspects described herein relate to a non-transitory computer-readable medium that stores a set of instructions for wireless communication by a one or more instructions that, when executed by one or more processors of an I-STA. The set of instructions, when executed by one or more processors of the one or more instructions that, when executed by one or more processors of an I-STA, may cause the one or more instructions that, when executed by one or more processors of an I-STA to receive a first ranging poll via a first bandwidth, the first ranging poll comprising an indication of a second ranging poll and first polling information transmitted with repetitions in a frequency domain based at least in part on a R-STA serving first I-STAs configured for communication using the first bandwidth and second I-STAs configured for communication using a second bandwidth that is smaller than the first bandwidth. The set of instructions, when executed by one or more processors of the one or more instructions that, when executed by one or more processors of an I-STA, may cause the one or more instructions that, when executed by one or more processors of an I-STA to receive, based at least in part on the indication of the second ranging poll, the second ranging poll over the second bandwidth comprising second polling information.

Some aspects described herein relate to a non-transitory computer-readable medium that stores a set of instructions for wireless communication by a one or more instructions that, when executed by one or more processors of an I-STA. The set of instructions, when executed by one or more processors of the one or more instructions that, when executed by one or more processors of an I-STA, may cause the one or more instructions that, when executed by one or more processors of an I-STA to establish a first link with a R-STA via a first radio chain and a second link with the R-STA via a second radio chain. The set of instructions, when executed by one or more processors of the one or more instructions that, when executed by one or more processors of an I-STA, may cause the one or more instructions that, when executed by one or more processors of an I-STA to receive one or more ranging communications of a ranging sequence, reception of the one or more ranging communications comprising, reception, during a ranging window, of the one or more ranging communications via the first link and not via the second link with the R-STA, reception of an MU-RTS or BSRP with the one or more ranging communications, the MU-RTS or BSRP indicating resources for the one or more ranging communications associated with one or more of the first link or the second link during the ranging window, or reception of a ranging poll with the one or more ranging communications, the ranging poll indicating resources for the one or more ranging communications associated with one or more of the first link or the second link during the ranging window.

Some aspects described herein relate to an apparatus for wireless communication. The apparatus may include means for transmitting a first ranging poll via a first bandwidth, the first ranging poll comprising an indication of a second ranging poll and first polling information transmitted with repetitions in a frequency domain based at least in part on serving first I-STAs configured for communication using the first bandwidth and second I-STAs configured for communication using a second bandwidth that is smaller than the first bandwidth. The apparatus may include means for transmitting, based at least in part on the indication of the second ranging poll, the second ranging poll over the second bandwidth comprising second polling information.

Some aspects described herein relate to an apparatus for wireless communication. The apparatus may include means for receiving a first ranging poll via a first bandwidth, the first ranging poll comprising an indication of a second ranging poll and first polling information transmitted with repetitions in a frequency domain based at least in part on a R-STA serving first I-STAs configured for communication using the first bandwidth and second I-STAs configured for communication using a second bandwidth that is smaller than the first bandwidth. The apparatus may include means for receiving, based at least in part on the indication of the second ranging poll, the second ranging poll over the second bandwidth comprising second polling information.

Some aspects described herein relate to an apparatus for wireless communication. The apparatus may include means for establishing a first link with a R-STA via a first radio chain and a second link with the R-STA via a second radio chain. The apparatus may include means for receiving one or more ranging communications of a ranging sequence, means for receiving the one or more ranging communications comprising, means for receiving, during a ranging window, the one or more ranging communications via the first link and not via the second link with the R-STA, means for receiving an MU-RTS or BSRP with the one or more ranging communications, the MU-RTS or BSRP indicating resources for the one or more ranging communications associated with one or more of the first link or the second link during the ranging window, or means for receiving a ranging poll with the one or more ranging communications, the ranging poll indicating resources for the one or more ranging communications associated with one or more of the first link or the second link during the ranging window.

Aspects generally include a method, apparatus, system, computer program product, non-transitory computer-readable medium, user equipment (UE), STA, AP, network node, network entity, wireless communication device, or process-ing system as substantially described with reference to and as illustrated by the drawings and specification.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclo-sure and are therefore not to be considered limiting of its scope, for the description may admit to other equally effec-tive aspects. The same reference numbers in different draw-ings may identify the same or similar elements.

FIG. 4 shows a timing diagram illustrating an example process for performing a ranging operation.

FIG. 5 is a diagram of an example associated with ranging polls, in accordance with the present disclosure.

FIG. 7 is a diagram illustrating an example process performed, for example, by an R-STA, in accordance with the present disclosure.

FIG. 8 is a diagram illustrating an example process performed, for example, by an I-STA, in accordance with the present disclosure.

FIG. 9 is a diagram illustrating an example process performed, for example, by an I-STA, in accordance with the present disclosure.

DETAILED DESCRIPTION

Figure 1:
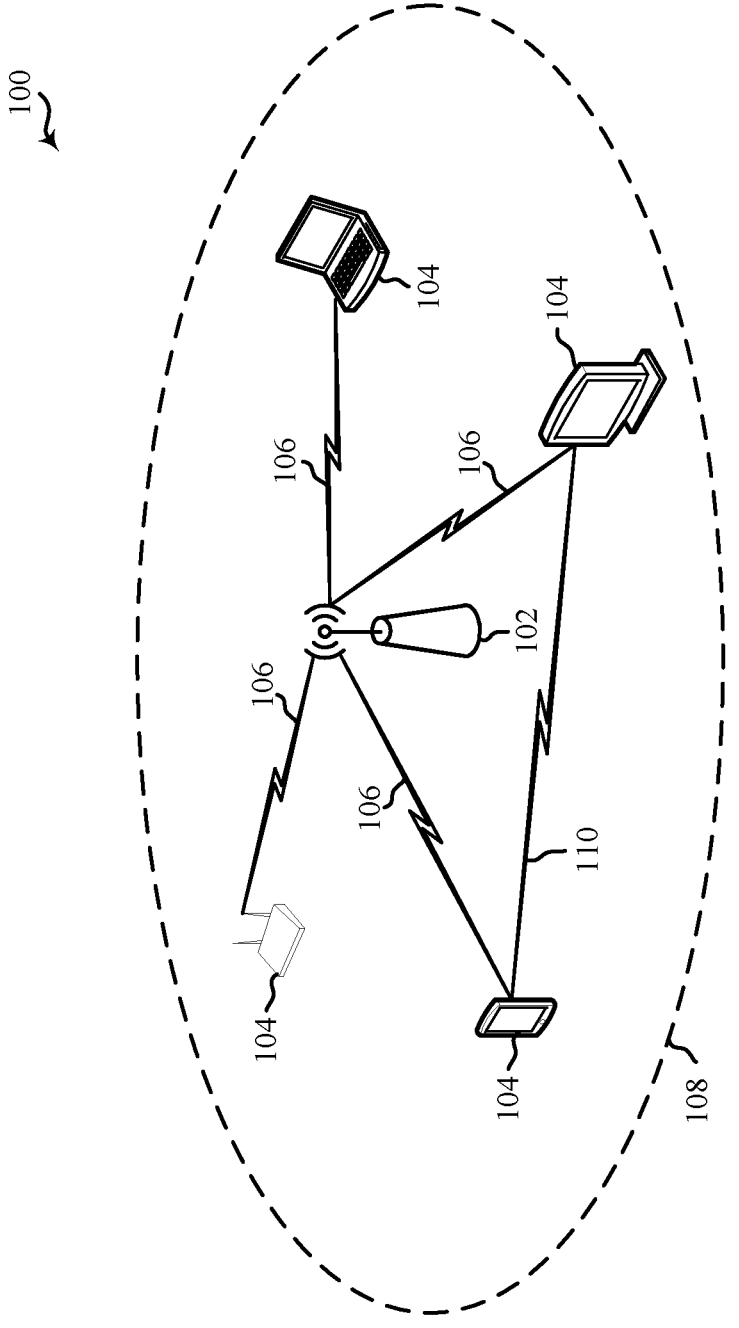
FIG. 1 shows a block diagram of an example wireless communication network, in accordance with the present disclosure.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among oth-ers. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spa-tial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication proto-cols or RF signals suitable for use in one or more of a wireless personal area network (WPAN), a wireless local area network (WLAN), a wireless wide area network (WWAN), a wireless metropolitan area network (WMAN), or an internet of things (IOT) network.

Various aspects relate generally to ranging polls (e.g., in a WLAN). Some aspects relate more specifically to a ranging window for a WLAN that serves initiating stations (I-STAs) configured to support different bandwidths. For example, a ranging window (e.g. Availability Window defined in IEEE 802.11az) for a WLAN that serves high efficiency (HE) STAs and extremely high throughput (EHT). In some aspects, a responding station (R-STA) may serve first I-STAs (e.g., that support a higher bandwidth, such as 320 MHz, 280 MHz, 240 MHz, or 200 MHz, among other examples) in a first portion of a ranging window or trans-mission opportunity (TXOP) (e.g., using an EHT ranging frames) and then may serve second I-STAs (e.g., that support a lower bandwidth, such as 160 MHz or less) in a second portion of the ranging window or TXOP (e.g., using an HE ranging frames). In some aspects, the R-STA may transmit a ranging poll using the higher bandwidth sup-ported by the first I-STAs, with the ranging poll backwards compatible for reception by the second I-STAs. For example, the R-STA may transmit the ranging polls as a message having repetitions in a frequency domain (e.g., a non-HT duplicate physical layer (PHY)) such that the sec-ond I-STAs may decode the message when receiving only a portion of a transmission of the message (e.g., one or more repetitions of the message). In this way, the I-STA may use a full bandwidth supported by the first I-STAs to improve ranging accuracy.

Some aspects more specifically relate to ranging polls for enhanced multi-link single radio (EMLSR) STAs or for enhanced multi-link multi radio (EMLMR) STAs. For brev-ity, the rest of this document focuses on EMLSR STAs in the examples, as the methods in this document applies to EMLMR STAs in similar ways. In some aspects, a commu-nication protocol and/or an AP (e.g., the R-STA) may indicate that an EMLSR STA is to behave as a single link STA on a link where a ranging window is negotiated (e.g., two radio chains may be tuned to a same channel and/or band associated with the link). In this way, the STA and the AP may conserve overhead and may use a ranging sequence defined in the communication protocol. In some aspects, the STA may switch to the link at the beginning of a ranging window that the STA (an I-STA) has negotiating with the AP (an R-STA) for the ranging window. The AP may not transmit data to the STA on any other link during the ranging window (e.g., multi-link communication is disabled during the ranging window). Additionally, or alternatively, the STA may be unable to communicate using overlapping ranging windows on different links.

In some aspects, the AP may transmit, along with a ranging communication, an MU request-to-send (RTS) and/ or a buffer status report poll (BSRP). For example, the AP may prepend the MU-RTS and/or the BSRP to a beginning of a ranging sequence. In this way, the AP may support ranging on multiple spatial streams with the I-STA on one of the links that is idle, which may improve ranging accuracy and link diversity.

In some aspects, a ranging poll (e.g. Trigger Frame (TF) Ranging Poll in IEEE 802.11az) may trigger the STA to switch to a polled link. The STA may transmit a clear-to-send (CTS)-to-self message on the polled link. In this way, the STA may perform polling in a way that conserved network resources by reducing overhead that may have otherwise been used to communicate control information or negotiations associated with the polling.

FIG. 1 shows a block diagram of an example wireless communication network 100. According to some aspects, the wireless communication network 100 can be an example of a WLAN such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8). The WLAN 100 may include numerous wireless communication devices such as a wireless AP 102 and multiple wireless STAs 104. While only one AP 102 is shown in FIG. 1, the WLAN network 100 also can include multiple APs 102. AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR, etc.) can be further improved by a small cell which is supported by an AP serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IoT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds ($\mu$s)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As a result, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics, such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct wireless communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some examples of the APs 102 and STAs 104 described herein also may communicate in other frequency bands, such as the 5.9 GHz and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As a result, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

Figure 2:
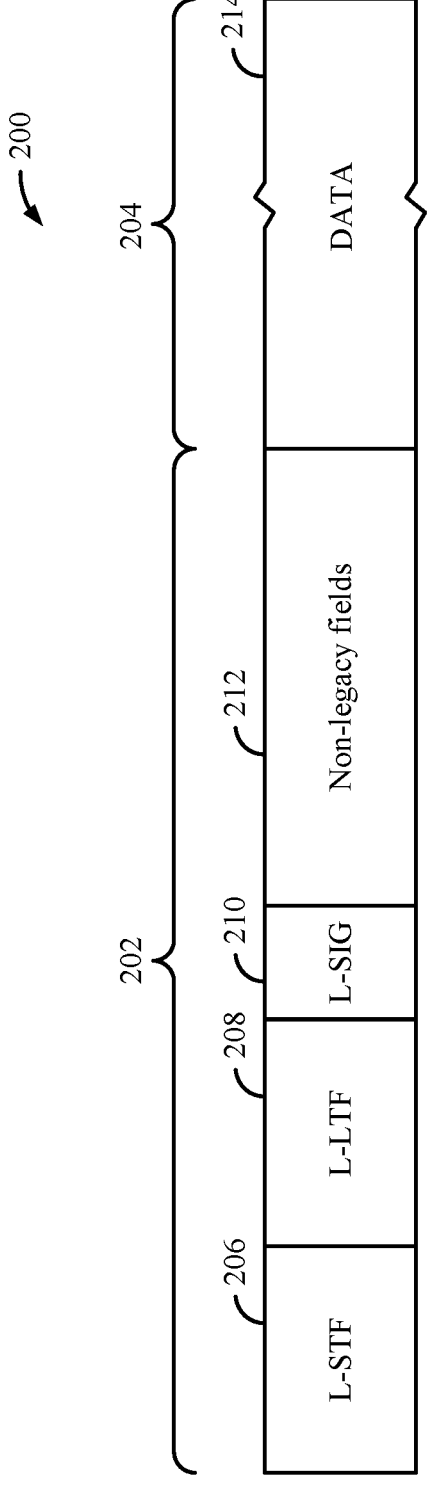
FIG. 2 illustrates shows an example of a protocol data unit (PDU) usable for communications between a wireless access point and one or more wireless stations, in accordance with the present disclosure.

FIG. 2 shows an example protocol data unit (PDU) 200 usable for wireless communication between a wireless AP 102 and one or more wireless STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel. The L-SIG 210 generally enables a receiving device to determine (for example, obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

Figure 3:
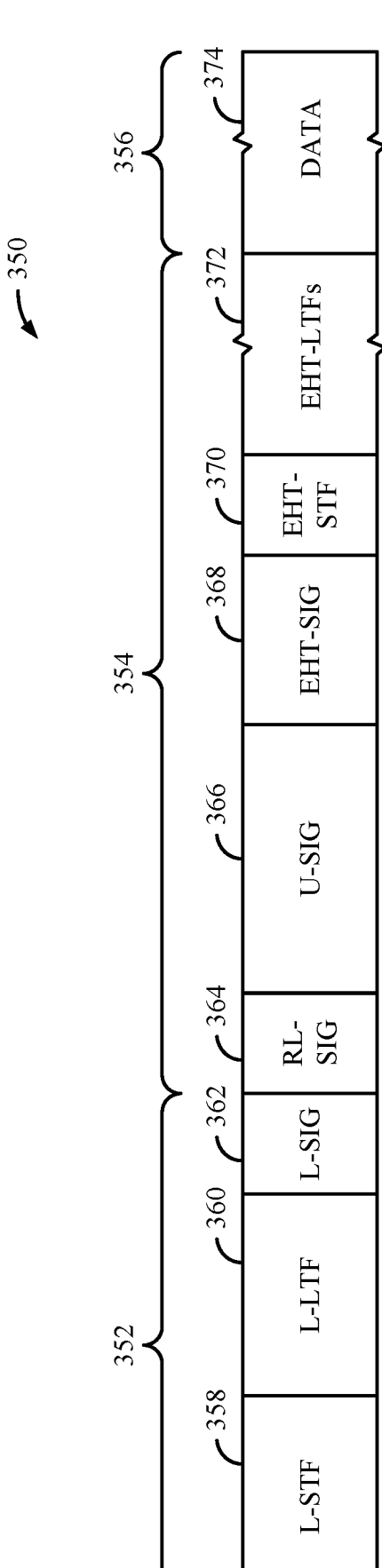
FIG. 3 illustrates an example of a physical layer (PHY) protocol data unit (PPDU) usable for communications between a wireless access point (AP) and one or more wireless stations (STAs), in accordance with the present disclosure.

FIG. 3 shows another example PPDU 350 usable for wireless communication between a wireless AP and one or more wireless STAs. The PPDU 350 may be used for SU, OFDMA or MU-MIMO transmissions. The PPDU 350 may be formatted as an EHT WLAN PPDU in accordance with the IEEE 802.11be amendment to the IEEE 802.11 family of wireless communication protocol standards, or may be formatted as a PPDU conforming to any later (post-EHT) version of a new wireless communication protocol conforming to a future IEEE 802.11 wireless communication protocol standard, such as the 802.11 amendment associated with Wi-Fi 8, or another wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes a repetition of L-SIG (RL-SIG) 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. One or both of U-SIG 366 and EHT-SIG 368 may be structured as, and carry version-dependent information for, other wireless communication protocol versions associated with amendments to the IEEE family of standards beyond EHT. For example, U-SIG 366 may be used by a receiving device to interpret bits in one or more of EHT-SIG 368 or the data field 374. Like L-STF 358, L-LTF 360, and L-SIG 362, the information in U-SIG 366 and EHT-SIG 368 may be duplicated and transmitted in each of the component 20 MHz channels in instances involving the use of a bonded channel.

The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation.

EHT-SIG 368 may be used by an AP to identify and inform one or multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include resource unit (RU) allocation information, spatial stream configuration information, and per-user (for example, STA-specific) signaling information. Each EHT-SIG 368 may include a common field and at least one user-specific field. In the context of OFDMA, the common field can indicate RU distributions to multiple STAs 104, indicate the RU assignments in the frequency domain, indicate which RUs are allocated for MU-MIMO transmissions and which RUs correspond to OFDMA transmissions, and the number of users in allocations, among other examples. The user-specific fields are assigned to particular STAs 104 and carry STA-specific scheduling information such as user-specific modulation and coding scheme (MCS) values and user-specific RU allocation information. Such information enables the respective STAs 104 to identify and decode corresponding RUs in the associated data field 374.

In some wireless communications environments, EHT systems or other systems compliant with future generations of the IEEE 802.11 family of wireless communication protocol standards may provide additional capabilities over other previous systems (for example, HE systems or other legacy systems). EHT and newer wireless communication protocols may support flexible operating bandwidth enhancements at APs and STAs, such as broadened operating bandwidths relative to legacy operating bandwidths or more granular operation relative to legacy operation. For example, an EHT system may allow communications spanning operating bandwidths of 20 MHz, 40 MHz, 80 MHz, 160 MHz, 240 MHz and 320 MHz. EHT systems may support multiple bandwidth modes such as a contiguous 240 MHz bandwidth mode, a contiguous 320 MHz bandwidth mode, a noncontiguous 160+160 MHz bandwidth mode, or a noncontiguous 80+80+80+80 (or "4×80") MHz bandwidth mode.

In some examples in which a wireless communication device operates in a contiguous 320 MHz bandwidth mode or a 160+160 MHz bandwidth mode. Signals for transmission may be generated by two different transmit chains of the device each having a bandwidth of 160 MHz (and each coupled to a different power amplifier). In some other examples, signals for transmission may be generated by four or more different transmit chains of the device, each having a bandwidth of 80 MHz.

In some other examples, the wireless communication device may operate in a contiguous 240 MHz bandwidth mode, or a noncontiguous 160+80 MHz bandwidth mode. In some examples, the signals for transmission may be generated by three different transmit chains of the device, each having a bandwidth of 80 MHz. In some other examples, the 240 MHz/160+80 MHz bandwidth modes may also be formed by puncturing 320/160+160 MHz bandwidth modes with one or more 80 MHz subchannels. For example, signals for transmission may be generated by two different transmit chains of the device each having a bandwidth of 160 MHz with one of the transmit chains outputting a signal having an 80 MHz subchannel punctured therein.

The operating bandwidth also may accommodate concurrent operation on other unlicensed frequency bands (such as the 6 GHz band) and a portion of spectrum that includes frequency bands traditionally used by Wi-Fi technology. In noncontiguous examples, the operating bandwidth may span one or more disparate sub-channel sets. For example, the 320 MHz bandwidth may be contiguous and located in the same 6 GHz band or noncontiguous and located in different bands (such as partly in the 5 GHz band and partly in the 6 GHz band).

In some examples, operability enhancements associated with EHT and newer generations of the IEEE 802.11 family of wireless communication protocols, and in particular operation at an increased bandwidth, may include refinements to carrier sensing and signal reporting mechanisms. Such techniques may include modifications to existing rules, structure, or signaling implemented for legacy systems.

APs and STAs that include multiple antennas may support various diversity schemes. For example, spatial diversity may be used by one or both of a transmitting device or a receiving device to increase the robustness of a transmission. For example, to implement a transmit diversity scheme, a transmitting device may transmit the same data redundantly over two or more antennas.

APs and STAs that include multiple antennas also may support space-time block coding (STBC). With STBC, a transmitting device also transmits multiple copies of a data stream across multiple antennas to exploit the various received versions of the data to increase the likelihood of decoding the correct data. More specifically, the data stream to be transmitted is encoded in blocks, which are distributed among the spaced antennas and across time. Generally, STBC can be used when the number N_Tx of transmit antennas exceeds the number N_SS of spatial streams. The N_SS spatial streams may be mapped to a number N_STS of space-time streams, which are then mapped to N_Tx transmit chains.

APs and STAs that include multiple antennas also may support spatial multiplexing, which may be used to increase the spectral efficiency and the resultant throughput of a transmission. To implement spatial multiplexing, the transmitting device divides the data stream into a number N_SS of separate, independent spatial streams. The spatial streams are then separately encoded and transmitted in parallel via the multiple N_Tx transmit antennas. APs and STAs that include multiple antennas also may support beamforming. Beamforming generally refers to the steering of the energy of a transmission in the direction of a target receiver. Beamforming may be used both in an SU context, for example, to improve a signal-to-noise ratio (SNR), as well as in an MU context, for example, to enable MU-MIMO transmissions (also referred to as SDMA). In the MU-MIMO context, beamforming may additionally or alternatively involve the nulling out of energy in the directions of other receiving devices. To perform SU beamforming or MU-MIMO, a transmitting device, referred to as the beamformer, transmits a signal from each of multiple antennas. The beamformer configures the amplitudes and phase shifts between the signals transmitted from the different antennas such that the signals add constructively along particular directions towards the intended receiver (referred to as the beamformee) or add destructively in other directions towards other devices to mitigate interference in an MU-MIMO context. The manner in which the beamformer configures the amplitudes and phase shifts depends on channel state information (CSI) associated with the wireless channels over which the beamformer intends to communicate with the beamformee.

To obtain the CSI necessary for beamforming, the beamformer may perform a channel sounding procedure with the beamformee. For example, the beamformer may transmit one or more sounding signals (for example, in the form of a null data packet (NDP)) to the beamformee. An NDP is a PPDU without any data field. The beamformee may then perform measurements for each of the $N\_Tx \times N\_Rx$ subchannels corresponding to all of the transmit antenna and receive antenna pairs associated with the sounding signal. The beamformee generates a feedback matrix associated with the channel measurements and, typically, compresses the feedback matrix before transmitting the feedback to the beamformer. The beamformer may then generate a precoding (or "steering") matrix for the beamformee associated with the feedback and use the steering matrix to precode the data streams to configure the amplitudes and phase shifts for subsequent transmissions to the beamformee. The beamformer may use the steering matrix to determine (for example, identify, detect, ascertain, calculate, or compute) how to transmit a signal on each of its antennas to perform beamforming. For example, the steering matrix may be indicative of a phase shift, power level, etc. to use to transmit a respective signal on each of the beamformer's antennas.

A transmitting device may support the use of diversity schemes. When performing beamforming, the transmitting beamforming array gain is logarithmically proportional to the ratio of $N\_Tx$ to $N\_SS$. As such, it is generally desirable, within other constraints, to increase the number $N\_Tx$ of transmit antennas when performing beamforming to increase the gain. It is also possible to more accurately direct transmissions or nulls by increasing the number of transmit antennas. This is especially advantageous in MU transmission contexts in which it is particularly important to reduce inter-user interference.

To increase an AP's spatial multiplexing capability, an AP may need to support an increased number of spatial streams (such as up to 16 spatial streams). However, supporting additional spatial streams may result in increased CSI feedback overhead. Implicit CSI acquisition techniques may avoid CSI feedback overhead by taking advantage of the assumption that the UL and DL channels have reciprocal impulse responses (that is, that there is channel reciprocity). For examples, the CSI feedback overhead may be reduced using an implicit channel sounding procedure such as an implicit beamforming report (BFR) technique (such as where STAs transmit NDP sounding packets in the UL while the AP measures the channel) because no BFRs are sent. Once the AP receives the NDPs, it may implicitly assess the channels for each of the STAs and use the channel assessments to configure steering matrices. In order to mitigate hardware mismatches that could break the channel reciprocity on the UL and DL (such as the baseband-to-RF and RF-to-baseband chains not being reciprocal), the AP may implement a calibration method to compensate for the mismatch between the UL and the DL channels. For example, the AP may select a reference antenna, transmit a pilot signal from each of its antennas, and estimate baseband-to-RF gain for each of the non-reference antennas relative to the reference antenna.

In some examples, multiple APs may transmit to one or more STAs at a time utilizing a distributed MU-MIMO scheme. Examples of such distributed MU-MIMO transmissions include coordinated beamforming (CBF) and joint transmission (JT). With CBF, signals (such as data streams) for a given STA may be transmitted by only a single AP. However, the coverage areas of neighboring APs may overlap, and signals transmitted by a given AP may reach the STAs in OBSSs associated with neighboring APs as OBSS signals. CBF allows multiple neighboring APs to transmit simultaneously while minimizing or avoiding interference, which may result in more opportunities for spatial reuse. More specifically, using CBF techniques, an AP may beamform signals to in-BSS STAs while forming nulls in the directions of STAs in OBSSs such that any signals received at an OBSS STA are of sufficiently low power to limit the interference at the STA. To accomplish this, an inter-BSS coordination set may be defined between the neighboring APs, which contains identifiers of all APs and STAs participating in CBF transmissions.

With JT, signals for a given STA may be transmitted by multiple coordinated APs. For the multiple APs to concurrently transmit data to a STA, the multiple APs may all need a copy of the data to be transmitted to the STA. Accordingly, the APs may need to exchange the data among each other for transmission to a STA. With JT, the combination of antennas of the multiple APs transmitting to one or more STAs may be considered as one large antenna array (which may be represented as a virtual antenna array) used for beamforming and transmitting signals. In combination with MU-MIMO techniques, the multiple antennas of the multiple APs may be able to transmit data via multiple spatial streams. Accordingly, each STA may receive data via one or more of the multiple spatial streams.

APs 102 and STAs 104 can support MU communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize MU-MIMO and multiuser orthogonal frequency division multiple access (MU-OFDMA) techniques.

In MU-OFDMA schemes, the available frequency spectrum of the wireless channel may be divided into multiple RUs, each including multiple frequency subcarriers (also referred to as "tones"). Different RUs may be allocated or assigned by an AP 102 to different STAs 104 at particular times. The sizes and distributions of the RUs may be referred to as an RU allocation. In some examples, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs also may be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective AIDs, and may assign each AID (and thus each STA 104) one or more RUs that can be used to send UL traffic to the AP 102. The AP also may designate one or more random access (RA) RUs for which unscheduled STAs 104 may contend.

Some wireless communication devices (including both APs and STAs) are capable of multi-link operation (MLO). In some examples, MLO supports establishing multiple different communication links (such as a first link on the 2.4 GHz band, a second link on the 5 GHz band, and the third link on the 6 GHz band) between the STA and the AP. Each communication link may support one or more sets of channels or logical entities. In some cases, each communication link associated with a given wireless communication device may be associated with a respective radio of the wireless communication device, which may include one or more transmit/receive (Tx/Rx) chains, include or be coupled with one or more physical antennas, or include signal processing components, among other components. An MLO-capable device may be referred to as a multi-link device (MLD). For example, an AP MLD may include multiple APs each configured to communicate on a respective communication link with a respective one of multiple STAs of a non-AP MLD (also referred to as a "STA MLD"). The STA MLD may communicate with the AP MLD over one or more of the multiple communication links at a given time.

One type of MLO is multi-link aggregation (MLA), where traffic associated with a single STA is simultaneously transmitted across multiple communication links in parallel to maximize the utilization of available resources to achieve higher throughput. That is, during at least some duration of time, transmissions or portions of transmissions may occur over two or more links in parallel at the same time. In some examples, the parallel wireless communication links may support synchronized transmissions. In some other examples, or during some other durations of time, transmissions over the links may be parallel, but not be synchronized or concurrent. In some examples or durations of time, two or more of the links may be used for communications between the wireless communication devices in the same direction (such as all uplink or all downlink). In some other examples or durations of time, two or more of the links may be used for communications in different directions. For example, one or more links may support uplink communications and one or more links may support downlink communications. In such examples, at least one of the wireless communication devices operates in a full duplex mode. Generally, full duplex operation enables bi-directional communications where at least one of the wireless communication devices may transmit and receive at the same time.

MLA may be implemented in a number of ways. In some examples, MLA may be packet-based. For packet-based aggregation, frames of a single traffic flow (such as all traffic associated with a given traffic identifier (TID)) may be sent concurrently across multiple communication links. In some other examples, MLA may be flow-based. For flow-based aggregation, each traffic flow (such as all traffic associated with a given TID) may be sent using a single one of multiple available communication links. As an example, a single STA MLD may access a web browser while streaming a video in parallel. The traffic associated with the web browser access may be communicated over a first communication link while the traffic associated with the video stream may be communicated over a second communication link in parallel (such that at least some of the data may be transmitted on the first channel concurrently with data transmitted on the second channel).

In some other examples, MLA may be implemented as a hybrid of flow-based and packet-based aggregation. For example, an MLD may employ flow-based aggregation in situations in which multiple traffic flows are created and may employ packet-based aggregation in other situations. The determination to switch among the MLA techniques or modes may additionally or alternatively be associated with other metrics (such as a time of day, traffic load within the network, or battery power for a wireless communication device, among other factors or considerations).

To support MLO techniques, an AP MLD and a STA MLD may exchange supported MLO capability information (such as supported aggregation type or supported frequency bands, among other information). In some examples, the exchange of information may occur via a beacon signal, a probe request or probe response, an association request or an association response frame, a dedicated action frame, or an operating mode indicator (OMI), among other examples. In some examples, an AP MLD may designate a given channel in a given band as an anchor channel (such as the channel on which it transmits beacons and other management frames). In such examples, the AP MLD also may transmit beacons (such as ones which may contain less information) on other channels for discovery purposes.

MLO techniques may provide multiple benefits to a WLAN. For example, MLO may improve user perceived throughput (UPT) (such as by quickly flushing per-user transmit queues). Similarly, MLO may improve throughput by improving utilization of available channels and may increase spectral utilization (such as increasing the bandwidth-time product). Further, MLO may enable smooth transitions between multi-band radios (such as where each radio may be associated with a given RF band) or enable a framework to set up separation of control channels and data channels. Other benefits of MLO include reducing the ON time of a modem, which may benefit a wireless communication device in terms of power consumption. Another benefit of MLO is the increased multiplexing opportunities in the case of a single BSS. For example, multi-link aggregation may increase the number of users per multiplexed transmission served by the multi-link AP MLD.

Aspects of transmissions may vary according to a distance between a transmitter (for example, an AP 102 or a STA 104) and a receiver (for example, another AP 102 or STA 104). Wireless communication devices may generally benefit from having information regarding the location or proximities of the various STAs 104 within the coverage area. In some examples, relevant distances may be determined (for example, calculated or computed) using round trip time (RTT)-based ranging procedures. Additionally, in some examples, APs 102 and STAs 104 may perform ranging operations. In some cases, STAs 104 are associated with AP 102. In some other cases, STAs 104 is not associated with AP 102 and is still allowed to perform ranging operations. Each ranging operation may involve an exchange of fine timing measurement (FTM) frames (such as those defined in the 802.11az amendment to the IEEE family of wireless communication protocol standards) to obtain measurements of RTT transmissions between the wireless communication devices.

FIG. 4 shows a timing diagram illustrating an example process for performing a ranging operation 400. The process for the ranging operation 400 may be conjunctively performed by two wireless communication devices 402a and 402b in accordance with the IEEE 802.11az standards, which may each be an example of an AP 102 or a STA 104.

The ranging operation 400 begins in block 402 with the first wireless communication device 402a transmitting an initial FTM range request frame 404 at time $t_{0,1}$. Responsive to successfully receiving the FTM range request frame 404 at time $t_{0,2}$, the second wireless communication device 402b responds by transmitting a first ACK 406 at time $t_{0,3}$, which the first wireless communication device 402a receives at time $t_{0,4}$. The first wireless communication device 402a and the second wireless communication device 402b then exchange one or more FTM bursts, which may each include multiple exchanges of FTM action frames (hereinafter simply "FTM frames") and corresponding ACKs. One or more of the FTM range request frame 404 and the FTM action frames (hereinafter simply "FTM frames") may include FTM parameters specifying various characteristics of the ranging operation 400.

In the example shown in FIG. 4, in a first exchange, beginning at time $t_{1,1}$, the second wireless communication device 402b transmits a first FTM frame 408. The second wireless communication device 402b records the time $t_{1,1}$ as the time of departure (TOD) of the first FTM frame 408. The first wireless communication device 402a receives the first FTM frame 408 at time $t_{1,2}$ and transmits a first acknowledgement frame (ACK) 410 to the second wireless communication device 402b at time $t_{1,3}$. The first wireless communication device 402a records the time $t_{1,2}$ as the time of arrival (TOA) of the first FTM frame 408, and the time $t_{1,3}$ as the TOD of the first ACK 410. The second wireless communication device 402b receives the first ACK 410 at time $t_{1,4}$ and records the time $t_{1,4}$ as the TOA of the first ACK 410.

Similarly, in a second exchange, beginning at time $t_{2,1}$, the second wireless communication device 402b transmits a second FTM frame 412. The second FTM frame 412 includes a first field indicating the TOD of the first FTM frame 408 and a second field indicating the TOA of the first ACK 410. The first wireless communication device 402a receives the second FTM frame 412 at time $t_{2,2}$ and transmits a second ACK 414 to the second wireless communication device 402b at time $t_{2,3}$. The second wireless communication device 402b receives the second ACK 414 at time $t_{2,4}$. Similarly, in a third exchange, beginning at time $t_{3,1}$, the second wireless communication device 402b transmits a third FTM frame 416. The third FTM frame 416 includes a first field indicating the TOD of the second FTM frame 412 and a second field indicating the TOA of the second ACK 414. The first wireless communication device 402a receives the third FTM frame 416 at time $t_{3,2}$ and transmits a third ACK 418 to the second wireless communication device 402b at time $t_{3,3}$. The second wireless communication device 402b receives the third ACK 418 at time $t_{3,4}$. Similarly, in a fourth exchange, beginning at time $t_{4,1}$, the second wireless communication device 402b transmits a fourth FTM frame 420. The fourth FTM frame 420 includes a first field indicating the TOD of the third FTM frame 416 and a second field indicating the TOA of the third ACK 418. The first wireless communication device 402a receives the fourth FTM frame 420 at time $t_{4,2}$ and transmits a fourth ACK 422 to the second wireless communication device 402b at time $t_{4,3}$. The second wireless communication device 402b receives the fourth ACK 422 at time $t_{4,4}$.

The first wireless communication device 402a determines (for example, obtains, identifies, ascertains, calculates, or computes) a range indication in accordance with the TODs and TOAs. For example, in implementations or instances in which an FTM burst includes four exchanges of FTM frames, the first wireless communication device 402a may determine (for example, obtain, identify, ascertain, calculate, or compute) an RTT between itself and the second wireless communication device 402b in accordance with Equation 1.

$$RTT = \frac{1}{3}\left(\sum_{k=1}^{3} t_{4,k} - \sum_{k=1}^{3} t_{1,k}\right) - \left(\sum_{k=1}^{3} t_{3,k} - \sum_{k=1}^{3} t_{2,k}\right) \tag{1}$$

In some implementations, the range indication is the RTT. Additionally or alternatively, in some implementations, the first wireless communication device 402a may determine (for example, obtain, identify, ascertain, calculate, or compute) an actual approximate distance between itself and the second wireless communication device 402b, for example, by multiplying the RTT by an approximate speed of light in the wireless medium. In such instances, the range indication may additionally or alternatively include the distance value. Additionally or alternatively, the range indication may include an indication as to whether the second wireless communication device 402b is within a proximity (for example, a service discovery threshold) of the first wireless communication device 402a in accordance with the RTT. In some implementations, the first wireless communication device 402a may then transmit the range indication to the second wireless communication device 402b, for example, in a range report 424 at time $t_{5,1}$, which the second wireless communication device receives at time $t_{5,2}$.

Various aspects relate generally to ranging polls (e.g., in a WLAN). Some aspects more specifically relate to a ranging window for a WLAN that serves I-STAs configured to support different bandwidths. For example, a ranging window for a WLAN that serves HE STAs and EHT STAs. In some aspects, a R-STA may serve first I-STAs (e.g., that support a higher bandwidth, such as 320 MHz, 280 MHz, 240 MHz, or 200 MHz, among other examples) in a first portion of a ranging window (e.g., using an EHT ranging null data physical layer (PHY) protocol data unit (PPDU) (NDP)) and then may serve second I-STAs (e.g., that support a lower bandwidth, such as 160 MHz or less) in a second portion of the ranging window (e.g., using an HE ranging NDP). In some aspects, the R-STA may transmit a ranging poll using the higher bandwidth supported by the first I-STAs, with the ranging poll backwards compatible for reception by the second I-STAs. For example, the R-STA may transmit the ranging polls as a message having repetitions in a frequency domain (e.g., a non-HT duplicate PHY) such that the second I-STAs may decode the message when receiving only a portion of a transmission of the message (e.g., one or more repetitions of the message). In this way, the I-STA may use a full bandwidth supported by the first I-STAs to improve ranging accuracy.

Some aspects more specifically relate to ranging polls for EMLSR STAs. In some aspects, a communication protocol and/or an AP (e.g., the R-STA) may indicate that an EMLSR STA is to behave as a single link STA on a link where a ranging window is negotiated (e.g., two radio chains may be tuned to a same channel and/or band associated with the link). In this way, the STA and the AP may conserve overhead and may use a ranging sequence defined in the communication protocol. In some aspects, the STA may switch to the link at the beginning of a ranging window that the STA (an I-STA) has negotiating with the AP (an R-STA) for the ranging window. The AP may not transmit data to the STA on any other link during the ranging window (e.g., multi-link communication is disabled during the ranging window). Additionally, or alternatively, the STA may be unable to communicate using overlapping ranging windows on different links.

In some aspects, the AP may transmit, along with a ranging communication, an MU-RTS and/or a BSRP. For example, the AP may prepend the MU-RTS and/or the BSRP to a beginning of a ranging sequence. In other words, the MU-RTS or BSRP frame serves as the initial frame of a frame exchange sequence to initiate a frame exchange with a STA operating in EMLSR mode. The frame exchange sequence here may be a ranging sequence (e.g. including measurement sounding and measurement report for ranging). In this way, the AP may support ranging on multiple spatial streams with the I-STA, which may improve ranging accuracy.

In some aspects, a ranging MU-RTS may trigger the STA to switch to a polled link. The STA may transmit a CTS-to-self message on the polled link. In this way, the STA may perform polling in a way that conserves network resources by reducing overhead that may have otherwise been used to communicate control information or negotiations associated with the polling.

FIG. 5 is a diagram of an example 500 associated with ranging polls, in accordance with the present disclosure. As shown in FIG. 5, an R-STA (e.g., an AP) may communicate with first I-STAs (e.g. one or more STAs, such as 320 MHz operating EHT STAs) and a second I-STAs (e.g., one or more STAs, such as HE STAs or other wireless communication devices (WCD)). In some aspects, the R-STA and the I-STAs may be part of a wireless network (e.g., wireless communication network 100). The R-STA and the I-STAs may have established a wireless connection prior to operations shown in FIG. 5.

As shown by reference number 505, the first I-STAs and the second I-STAs may receive, and the R-STA may transmit, a first ranging poll (e.g., a TF Ranging Poll in IEEE 802.11az) via a first bandwidth. The first ranging poll may indicate a second ranging poll in the same ranging window. For example, the first ranging poll may indicate the second ranging poll using a more TF subfield of a common info field of the TF ranging poll to indicate whether a subsequent TF ranging poll is scheduled for transmission within the same availability window.

In some aspects, the second I-STAs may receive the first ranging poll via only a portion of a total bandwidth on which the R-STA transmitted the first ranging poll. For example, the R-STA may transmit the first ranging poll using repetitions of a first ranging poll message that repeats in a frequency domain. The second I-STAs may receive and decode the first ranging poll based at least in part on decoding one or more of the repetitions, without receiving all of the repetitions. This may occur when, for example, the R-STA transmits the first ranging poll using an EHT bandwidth with backward compatibility for an HE I-STA.

In some aspects, the first I-STAs may receive the first ranging poll via the total bandwidth on which the R-STA transmitted the first ranging poll. In some aspects, the I-STA may be an EHT I-STA that supports the total bandwidth.

As shown by reference number 510, the first I-STAs may determine whether to transmit a first polling response to the first ranging poll. In some aspects, the first I-STAs may determine to transmit the first polling response based at least in part on whether identifiers of the first I-STAs are indicated in the ranging poll (e.g., in a user info field in the TF ranging poll frame)

As shown by reference number 515, the second I-STAs may determine not to transmit the first polling response based at least in part on the first ranging poll not including identifiers of the second I-STAs. In some aspects, the second I-STAs may determine to instead monitor for a subsequent ranging poll to which the second I-STA are to respond.

As shown by reference number 520, the first I-STAs may transmit a first polling response associated with the first ranging poll. In some aspects, the first polling response may include a CTS-to-self message.

As shown by reference number 525, the R-STA and the first I-STAs may perform a measurement sounding phase of a ranging sequence. The measurement sounding phase may include the R-STA transmitting a ranging sounding NDP. The measurement sounding phase may include an initiator-to-responder (I2R) NDP. In some aspects, the R-STA may receive multiple I2R NDPs from multiple I-STAs on multiple spatial streams.

In some aspects, the measurement sounding phase may include a ranging NDP announcement frame and/or a trigger frame.

As shown by reference number 530, the R-STA and the first I-STAs may perform a measurement report phase of the ranging sequence. In some aspects, the R-STA may transmit a report (associated with the first ranging poll) of a ranging measurement (e.g., a location measurement report (LMR)) to the first I-STAs. If at least one of the first I-STAs is an unassociated STA, in the report, the R-STA may include information on transmit power envelop (e.g. the Transmit Power Envelop element defined in IEEE 802.11) and/or information on the 20 MHz subchannel(s) that are punctured within the BSS operating bandwidth (e.g. using a bitmap to indicate which 20 MHz subchannels are punctured). The report may be carried in a Location Measurement Report frame defined in IEEE 802.11. Whether to include information on a transmit power envelop and/or information on the punctured 20 MHz subchannels is independent from whether the R-STA will perform the ranging procedures with the second I-STAs described in connection with reference numbers 535-560. For example, the R-STA may include the additional information in the LMR even if the R-STA does not serve legacy narrow-band STAs in the same ranging window.

As shown by reference number 535, the first I-STAs and the second I-STAs may receive, and the R-STA may transmit, a second ranging poll via a second bandwidth. The first ranging poll and the second ranging poll may be within a single ranging window.

In some aspects, the second bandwidth may be smaller than the first bandwidth. For example, the ranging sequence may not allow later transmissions to occupy a larger bandwidth than an earlier transmission during the same ranging sequence.

As shown by reference number 540, the first I-STAs may determine not to transmit the second polling response based at least in part on the second ranging poll not including identifiers of the first I-STAs. In some aspects, the first I-STAs may determine not to transmit the second polling response based at least in part on the first I-STAs performing operations described in connection with reference numbers

520-530. For example, the first I-STAs may determine not to transmit the second polling response based at least in part on already transmitting the first polling response As shown by reference number 545, the second I-STAs may determine whether to transmit a second polling response to the second ranging poll. In some aspects, the second I-STAs may determine to transmit the second polling response based at least in part on whether identifiers of the second I-STAs are indicated in the ranging pool (e.g. in a user info field in the TF Ranging poll frame.

As shown by reference number 550, the second I-STAs may transmit a second polling response associated with the second ranging poll. In some aspects, the second polling response may include a CTS-to-self message.

As shown by reference number 555, the R-STA and the second I-STAs may perform a measurement sounding phase of a ranging sequence associated with the second polling response. The measurement sounding phase may include one or more messages as described in connection with reference number 525.

As shown by reference number 560, the R-STA and the second I-STAs may perform a measurement report phase of the ranging sequence. In some aspects, the R-STA may transmit a report of a ranging measurement (associated with the second ranging poll) to the second I-STAs.

As indicated above, FIG. 5 is provided as an example. Other examples may differ from what is described with respect to FIG. 5.

Figure 6:
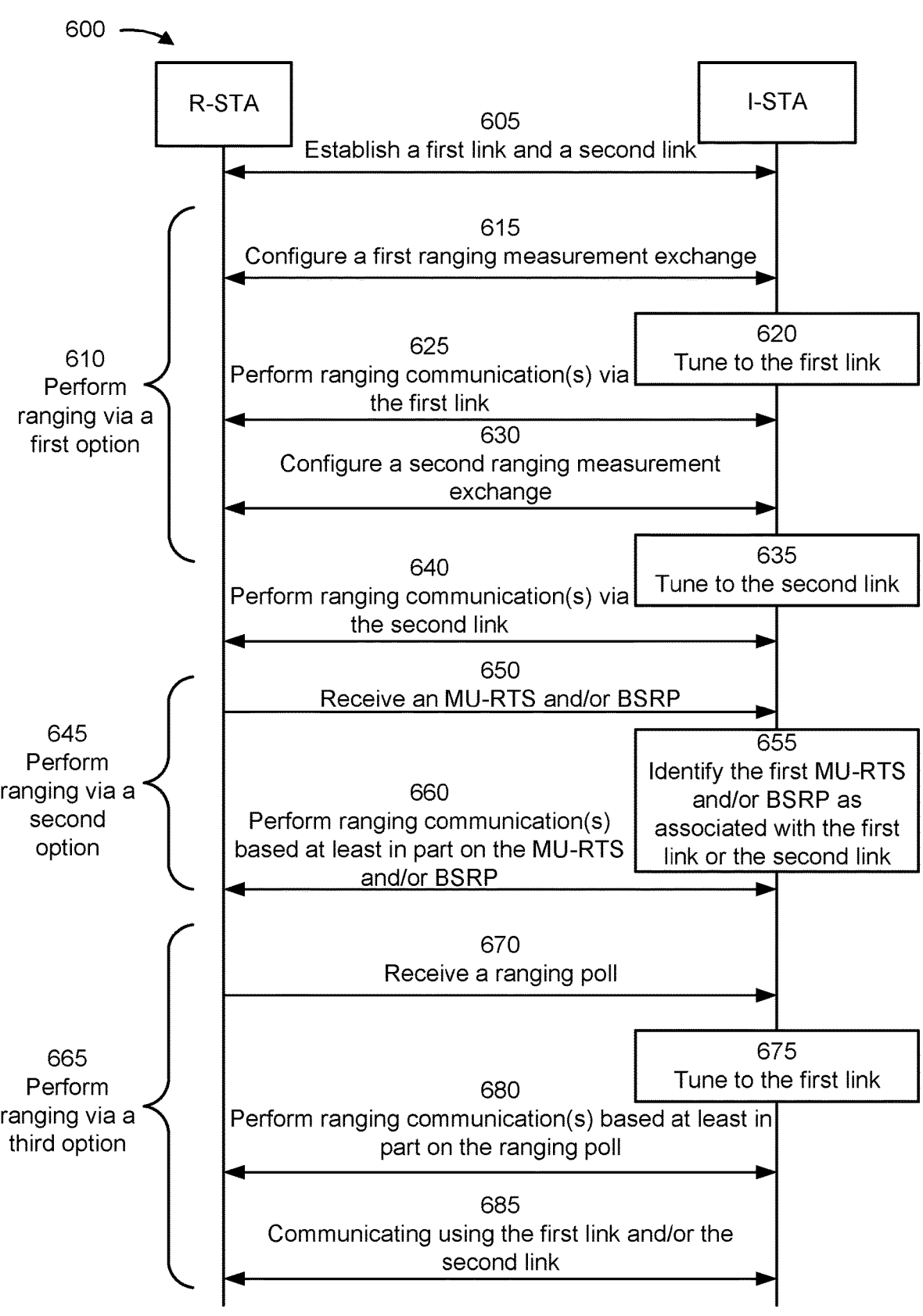
FIG. 6 is a diagram of an example associated with ranging polls, in accordance with the present disclosure.

FIG. 6 is a diagram of an example 600 associated with ranging polls, in accordance with the present disclosure. As shown in FIG. 6, an R-STA (e.g., an AP) may communicate with an I-STA (e.g., a STA or other WCD). In some aspects, the R-STA and the I-STA may be part of a wireless network (e.g., wireless communication network 100). The R-STA and the I-STA may have established a wireless connection prior to operations shown in FIG. 6.

As shown by reference number 605, the R-STA and the I-STA may establish a first link and a second link. In some aspects, the first link may be associated with a first radio chain of the I-STA, and the second link may be associated with a second radio chain of the I-STA. In some aspects, the I-STA may support multiple links based at least in part on the I-STA being an EMLSR STA.

To perform ranging with the I-STA having the first link and the second link, the I-STA and the R-STA may perform one of the following options 610, 640, or 660.

As shown by reference number 610, the I-STA and R-STA may perform ranging using a first option described in connection with reference numbers 615-635.

As shown by reference number 615, the R-STA and the I-STA may configure a first ranging measurement exchange. In some aspects, configuring the ranging measurement exchange may include negotiating a ranging window. Negotiating the ranging window may include identifying resources for performing ranging via the first link and/or resources for performing ranging via the second link.

As shown by reference number 620, the I-STA may tune to the first link as part of a ranging sequence. For example, the I-STA may tune to the first link based at least in part on the configured first ranging measurement exchange. In some aspects, the I-STA may tune the first radio chain and the second radio chain to the first link and/or an associated channel. In some aspects, the I-STA may turn off the second radio chain during the ranging sequence. In some aspects, the I-STA may tune to the first link based at least in part on negotiating a ranging window with the R-STA (e.g., an AP) associated with the first link.

As shown by reference number 625, the I-STA and the R-STA may perform one or more ranging communications via the first link. For example, the I-STA may transmit one or more communications and/or signaling, and the R-STA may transmit one or more communications and/or signaling.

In some aspects, the R-STA may be configured not to transmit data to the I-STA on any other links (e.g., the second link) during the ranging window. In some aspects, the I-STA may be configured not to perform ranging on different links via overlapping ranging windows.

In some aspects, the I-STA may only perform ranging on the first link. Alternatively, the I-STA may perform ranging on the second link after configuring corresponding ranging windows on the second link as shown by reference number 630.

As shown by reference number 635, the I-STA may tune to the second link. For example, the I-STA may tune to the second link based at least in part on the configuration of the second ranging measurement exchange. In some aspects, the I-STA may tune to the second link to perform ranging for the second link during the ranging window configured for the second link. During this ranging window, the R-STA may not send any data to the I-STA on any other link.

As shown by reference number 640, the I-STA and the R-STA may perform one or more ranging communications via the second link. For example, the I-STA may transmit one or more communications and/or signaling, and the R-STA may transmit one or more communications and/or signaling.

As shown by reference number 645, the I-STA and R-STA may perform ranging using a second option described in connection with reference numbers 645-655.

As shown by reference number 650, the I-STA may receive, and the R-STA may transmit, an MU-RTS and/or BSRP. In some aspects, the MU-RTS and/or BSRP may comprise a control frame for a ranging sequence (e.g., an 802.11be control frame). The MU-RTS and/or BSRP may indicate to perform ranging using the first link or the second link.

In some aspects, the control frame may include transmission of the MU-RTS by the R-STA and a response of a CTS from the I-STA. In some aspects, the control frame may include transmission of the BSRP by the R-STA and a response of a buffer status report (BSR) from the I-STA (e.g., an EHT PPDU and/or BSR).

As shown by reference number 655, the I-STA may identify the first MU-RTS and/or the BSRP as associated with the first link or the second link.

As shown by reference number 660, the R-STA and the I-STA may perform one or more ranging communications based at least in part on a link on which the MU-RTS and/or BSRP was received. For example, the R-STA and the I-STA may perform one or more ranging communications on the link on which the MU-RTS and/or BSRP was received.

As shown by reference number 665, the I-STA and R-STA may perform ranging using a third option described in connection with reference numbers 665-675.

As shown by reference number 670, the I-STA may receive, and the R-STA may transmit, a ranging poll. In some aspects, the ranging poll may indicate that the I-STA is to tune to a polled link as indicated via the ranging poll. In some aspects, the ranging poll may indicate the polled link explicitly (e.g., using a link identifier) or implicitly (e.g., based at least in part on resources used to transmit the ranging poll). In this way, the ranging poll may serve two purposes: triggering the I-STA to switch to the polled link and to transmit a CTS-to-self on the link.

As shown by reference number 675, the I-STA may tune to the first link based at least in part on the ranging poll indicating to perform ranging via the first link.

As shown by reference number 680, the R-STA and the I-STA may perform one or more ranging communications based at least in part on the ranging poll.

As shown by reference number 685, the R-STA and the I-STA may communicate using the first link and/or the second link. In some aspects, the I-STA and the R-STA may communicate based at least in part on ranging information obtained using one of the options described in connection with reference numbers 610, 640, or 660.

As indicated above, FIG. 6 is provided as an example. Other examples may differ from what is described with respect to FIG. 6.

FIG. 7 is a diagram illustrating an example process 700 performed, for example, by an R-STA, in accordance with the present disclosure. Example process 700 is an example where the R-STA (e.g., AP) performs operations associated with ranging polls.

As shown in FIG. 7, in some aspects, process 700 may include transmitting a first ranging poll via a first bandwidth, the first ranging poll comprising an indication of a second ranging poll and first polling information transmitted with repetitions in a frequency domain based at least in part on serving first I-STAs configured for communication using the first bandwidth and second I-STAs configured for communication using a second bandwidth that is smaller than the first bandwidth (block 710). For example, the R-STA (e.g., using transmission component 1004 and/or communication manager 1008, depicted in FIG. 10) may transmit a first ranging poll via a first bandwidth, the first ranging poll comprising an indication of a second ranging poll and first polling information transmitted with repetitions in a frequency domain based at least in part on serving first I-STAs configured for communication using the first bandwidth and second I-STAs configured for communication using a second bandwidth that is smaller than the first bandwidth, as described above.

As further shown in FIG. 7, in some aspects, process 700 may include transmitting, based at least in part on the indication of the second ranging poll, the second ranging poll over the second bandwidth comprising second polling information (block 720). For example, the R-STA (e.g., using transmission component 1004 and/or communication manager 1008, depicted in FIG. 10) may transmit, based at least in part on the indication of the second ranging poll, the second ranging poll over the second bandwidth comprising second polling information, as described above.

Process 700 may include additional aspects, such as any single aspect or any combination of aspects described below and/or in connection with one or more other processes described elsewhere herein.

In a first aspect, process 700 includes receiving one or more of a first polling response to the first ranging poll from one or more of the first I-STAs, or a second polling response to the second ranging poll from one or more of the second I-STAs.

In a second aspect, alone or in combination with the first aspect, the first bandwidth is greater than 160 megahertz (MHz) and the second bandwidth is 160 MHz or less.

In a third aspect, alone or in combination with one or more of the first and second aspects, a first size of the first bandwidth and a second size of the second bandwidth are integer multiples of a bandwidth size of the repetitions of the first polling information.

In a fourth aspect, alone or in combination with one or more of the first through third aspects, transmitting the first ranging poll and transmitting the second ranging poll comprises transmitting the first ranging poll and the second ranging poll within a single ranging window.

In a fifth aspect, alone or in combination with one or more of the first through fourth aspects, the single ranging window comprises resources for one or more of a first measurement sounding phase, after the first ranging poll and before the second ranging poll, associated with the first I-STAs, a first measurement report phase, after the first ranging poll and before the second ranging poll, associated with the first I-STAs, a second measurement sounding phase, after the second ranging poll, associated with the second I-STAs, or a second measurement report phase, after the second ranging poll, associated with the second I-STAs.

In a sixth aspect, alone or in combination with one or more of the first through fifth aspects, transmitting the first ranging poll comprises transmitting the first ranging poll as a non-high-throughput duplicate PPDU.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by an I-STA, in accordance with the present disclosure. Example process 800 is an example where the I-STA (e.g., a STA or other WCD) performs operations associated with ranging polls.

As shown in FIG. 8, in some aspects, process 800 may include receiving a first ranging poll via a first bandwidth, the first ranging poll comprising an indication of a second ranging poll and first polling information transmitted with repetitions in a frequency domain based at least in part on a R-STA serving first I-STAs configured for communication using the first bandwidth and second I-STAs configured for communication using a second bandwidth that is smaller than the first bandwidth (block 810). For example, the I-STA (e.g., using reception component 1102 and/or communication manager 1108, depicted in FIG. 11) may receive a first ranging poll via a first bandwidth, the first ranging poll comprising an indication of a second ranging poll and first polling information transmitted with repetitions in a frequency domain based at least in part on a R-STA serving first I-STAs configured for communication using the first bandwidth and second I-STAs configured for communication using a second bandwidth that is smaller than the first bandwidth, as described above.

As further shown in FIG. 8, in some aspects, process 800 may include receiving, based at least in part on the indication of the second ranging poll, the second ranging poll over the second bandwidth comprising second polling information (block 820). For example, the I-STA (e.g., using reception component 1102 and/or communication manager 1108) may receive, based at least in part on the indication of the second ranging poll, the second ranging poll over the second bandwidth comprising second polling information, as described above.

Process 800 may include additional aspects, such as any single aspect or any combination of aspects described below and/or in connection with one or more other processes described elsewhere herein.

In a first aspect, process 800 includes transmitting one or more of a first polling response to the first ranging poll from one or more of the first I-STAs, or a second polling response to the second ranging poll from one or more of the second I-STAs.

In a second aspect, alone or in combination with the first aspect, the first bandwidth is greater than 160 MHz and the second bandwidth is 160 MHz or less.

In a third aspect, alone or in combination with one or more of the first and second aspects, a first size of the first bandwidth and a second size of the second bandwidth are integer multiples of a bandwidth size of the repetitions of the first polling information.

In a fourth aspect, alone or in combination with one or more of the first through third aspects, receiving the first ranging poll and receiving the second ranging poll comprises receiving the first ranging poll and the second ranging poll within a single ranging window.

In a fifth aspect, alone or in combination with one or more of the first through fourth aspects, the single ranging window comprises resources for one or more of a first measurement sounding phase, after the first ranging poll and before the second ranging poll, associated with the first I-STAs, a first measurement report phase, after the first ranging poll and before the second ranging poll, associated with the first I-STAs, a second measurement sounding phase, after the second ranging poll, associated with the second I-STAs, or a second measurement report phase, after the second ranging poll, associated with the second I-STAs.

In a sixth aspect, alone or in combination with one or more of the first through fifth aspects, receiving the first ranging poll comprises receiving the first ranging poll as a non-high-throughput duplicate PPDU.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by an I-STA, in accordance with the present disclosure. Example process 900 is an example where the I-STA (e.g., I-STA or other WCD) performs operations associated with ranging polls.

As shown in FIG. 9, in some aspects, process 900 may include establishing a first link with a R-STA via a first radio chain and a second link with the R-STA via a second radio chain (block 910). For example, the I-STA (e.g., using communication manager 1108, depicted in FIG. 11) may establish a first link with a R-STA via a first radio chain and a second link with the R-STA via a second radio chain, as described above.

As further shown in FIG. 9, in some aspects, process 900 may include receiving one or more ranging communications of a ranging sequence, receiving the one or more ranging communications comprising: receiving, during a ranging window, the one or more ranging communications via the first link and not via the second link with the R-STA, receiving a multi-user request-to-send (MU-RTS) or BSRP with the one or more ranging communications, the MU-RTS or BSRP indicating resources for the one or more ranging communications associated with one or more of the first link or the second link during the ranging window, or receiving a ranging poll with the one or more ranging communications, the ranging poll indicating resources for the one or more ranging communications associated with one or more of the first link or the second link during the ranging window (block 920). For example, the I-STA (e.g., using reception component 1102 and/or communication manager 1108, depicted in FIG. 11) may receive one or more ranging communications of a ranging sequence, receiving the one or more ranging communications comprising: receiving, during a ranging window, the one or more ranging communications via the first link and not via the second link with the R-STA, receiving an MU-RTS or BSRP with the one or more ranging communications, the MU-RTS or BSRP indicating resources for the one or more ranging communications associated with one or more of the first link or the second link during the ranging window, or receiving a ranging poll with the one or more ranging communications, the ranging poll indicating resources for the one or more ranging communications associated with one or more of the first link or the second link during the ranging window, as described above.

Process 900 may include additional aspects, such as any single aspect or any combination of aspects described below and/or in connection with one or more other processes described elsewhere herein.

In a first aspect, process 900 includes communicating with the R-STA, using one or more of the first link or the second link, based at least in part on the ranging sequence.

In a second aspect, alone or in combination with the first aspect, receiving the one or more ranging communications comprises receiving the one or more ranging communications via the first link and not via the second link, and wherein receiving the one or more ranging communications via the first link comprises tuning the first radio chain and the second radio chain to the first link during a ranging window that is associated with the first link.

In a third aspect, alone or in combination with one or more of the first and second aspects, process 900 includes communicating, before receiving the one or more ranging communications, parameters for the ranging window, wherein the parameters indicate to use the first link and not the second link for receiving the one or more ranging communications.

In a fourth aspect, alone or in combination with one or more of the first through third aspects, receiving the one or more ranging communications comprises receiving the MU-RTS or BSRP with the one or more ranging communications, and wherein receiving the one or more ranging communications comprises receiving the one or more ranging communications via the first link or receiving the one or more ranging communications via the second link.

In a fifth aspect, alone or in combination with one or more of the first through fourth aspects, process 900 includes transmitting an I2R message via a first spatial stream associated with the first link and using the first radio chain, and transmitting an I2R message via a second spatial stream associated with the first link and using the second radio chain.

In a sixth aspect, alone or in combination with one or more of the first through fifth aspects, process 900 includes receiving a ranging NDP announcement, receiving an R2I message via a first spatial stream associated with the first link and using the first radio chain, and receiving an R2I message via a second spatial stream associated with the first link and using the second radio chain.

In a seventh aspect, alone or in combination with one or more of the first through sixth aspects, process 900 includes identifying the MU-RTS or BSRP as being associated with the first link or the second link independently, or in an absence of, the ranging poll received after the MU-RTS or BSRP.

In an eighth aspect, alone or in combination with one or more of the first through seventh aspects, receiving the one or more ranging communications comprises receiving the ranging poll that triggers the I-STA to switch to the first link based at least in part on the first link being the polled link and to transmit the clear-to-send-to-self message via the first link, and wherein receiving the one or more ranging communications comprises receiving the one or more ranging communications via the first link and receiving the one or more ranging communications via the second link.

In a ninth aspect, alone or in combination with one or more of the first through eighth aspects, based at least in part on the ranging poll that triggers the I-STA to switch to the first link, the I-STA does not receive the MU-RTS or BSRP with the one or more ranging communications.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
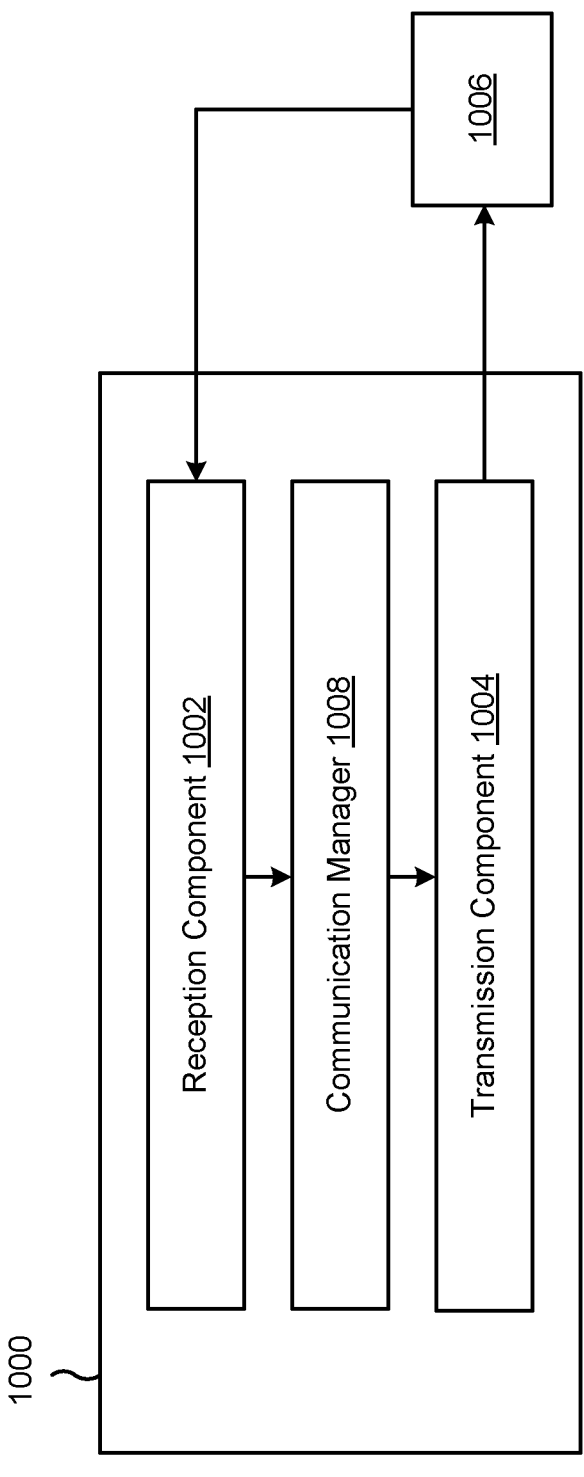
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a R-STA, or a R-STA may include the apparatus 1000. In some aspects, the apparatus 1000 includes a reception component 1002, a transmission component 1004, and/or a communication manager 1008, which may be in communication with one another (for example, via one or more buses and/or one or more other components). As shown, the apparatus 1000 may communicate with another apparatus 1006, such as a STA or an AP using the reception component 1002 and the transmission component 1004.

In some aspects, the apparatus 1000 may be configured to perform one or more operations described herein in connection with FIGS. 5-6. Additionally, or alternatively, the apparatus 1000 may be configured to perform one or more processes described herein, such as process 700 of FIG. 7 or a combination thereof. In some aspects, the apparatus 1000 and/or one or more components shown in FIG. 10 may include one or more components of the R-STA described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the R-STA described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the R-STA described in connection with FIG. 2. In some aspects, the transmission component 1004 may be co-located with the reception component 1002 in a transceiver.

The communication manager 1008 may support operations of the reception component 1002 and/or the transmission component 1004. For example, the communication manager 1008 may receive information associated with configuring reception of communications by the reception component 1002 and/or transmission of communications by the transmission component 1004. Additionally, or alternatively, the communication manager 1008 may generate and/or provide control information to the reception component 1002 and/or the transmission component 1004 to control reception and/or transmission of communications.

The transmission component 1004 may transmit a first ranging poll via a first bandwidth, the first ranging poll comprising an indication of a second ranging poll and first polling information transmitted with repetitions in a frequency domain based at least in part on serving first I-STAs configured for communication using the first bandwidth and second I-STAs configured for communication using a second bandwidth that is smaller than the first bandwidth. The transmission component 1004 may transmit, based at least in part on the indication of the second ranging poll, the second ranging poll over the second bandwidth comprising second polling information.

The reception component 1002 may receive one or more of a first polling response to the first ranging poll from one or more of the first I-STAs; or a second polling response to the second ranging poll from one or more of the second I-STAs.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
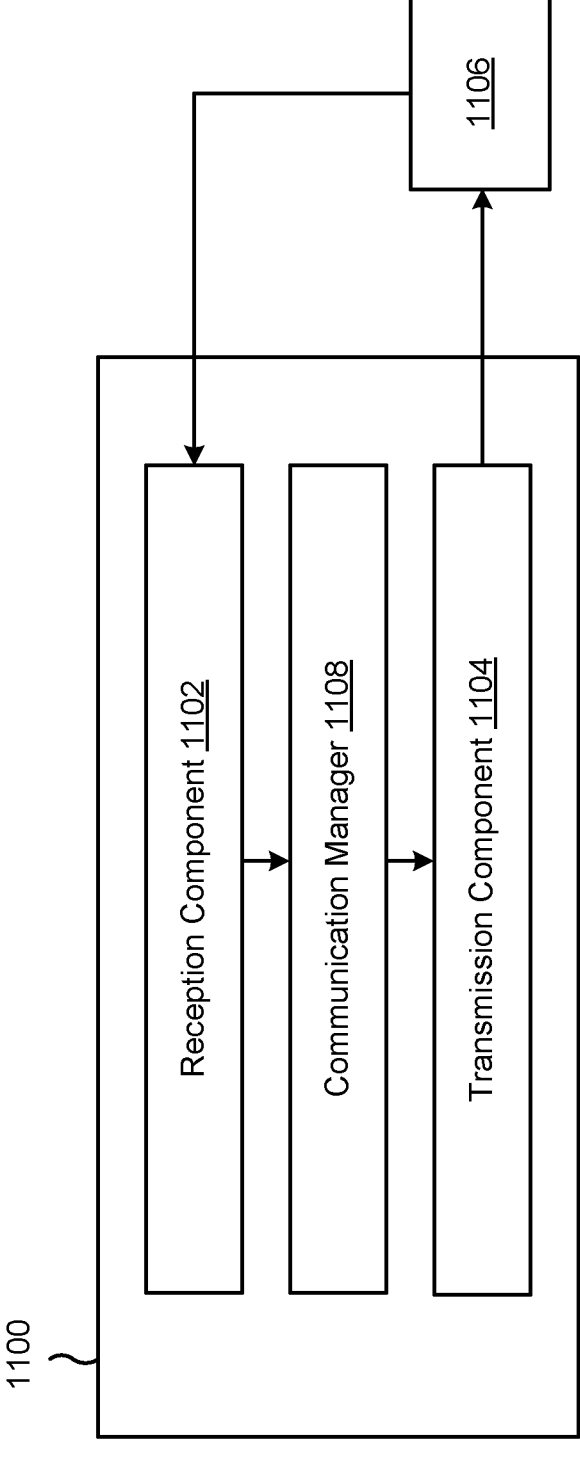
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a I-STA, or a I-STA may include the apparatus 1100. In some aspects, the apparatus 1100 includes a reception component 1102, a transmission component 1104, and/or a communication manager 1108, which may be in communication with one another (for example, via one or more buses and/or one or more other components). As shown, the apparatus 1100 may communicate with another apparatus 1106, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 5-6. Additionally, or alternatively, the apparatus 1100 may be configured to perform one or more processes described herein, such as process 800 of FIG. 8, process 900 of FIG. 9, or a combination thereof. In some aspects, the apparatus 1100 and/or one or more components shown in FIG. 11 may include one or more components of the I-STA described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the I-STA described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the I-STA described in connection with FIG. 2. In some aspects, the transmission component 1104 may be co-located with the reception component 1102 in a transceiver.

The communication manager 1108 may support operations of the reception component 1102 and/or the transmission component 1104. For example, the communication manager 1108 may receive information associated with configuring reception of communications by the reception component 1102 and/or transmission of communications by the transmission component 1104. Additionally, or alternatively, the communication manager 1108 may generate and/or provide control information to the reception component 1102 and/or the transmission component 1104 to control reception and/or transmission of communications.

The reception component 1102 may receive a first ranging poll via a first bandwidth, the first ranging poll comprising an indication of a second ranging poll and first polling information transmitted with repetitions in a frequency domain based at least in part on a R-STA serving first I-STAs configured for communication using the first bandwidth and second I-STAs configured for communication using a second bandwidth that is smaller than the first bandwidth. The reception component 1102 may receive, based at least in part on the indication of the second ranging poll, the second ranging poll over the second bandwidth comprising second polling information.

The transmission component 1104 may transmit one or more of a first polling response to the first ranging poll from one or more of the first I-STAs; or a second polling response to the second ranging poll from one or more of the second I-STAs.

The communication manager 1108 may establish a first link with a R-STA via a first radio chain and a second link with the R-STA via a second radio chain. The reception component 1102 may receive one or more ranging communications of a ranging sequence, receiving the one or more ranging communications comprising receiving, during a ranging window, the one or more ranging communications via the first link and not via the second link with the R-STA, receiving an MU-RTS or BSRP with the one or more ranging communications, the MU-RTS or BSRP indicating resources for the one or more ranging communications associated with one or more of the first link or the second link during the ranging window, or receiving a ranging poll with the one or more ranging communications, the ranging poll indicating resources for the one or more ranging communications associated with one or more of the first link or the second link during the ranging window.

The communication manager 1108 may communicate with the R-STA, using one or more of the first link or the second link, based at least in part on the ranging sequence.

The communication manager 1108 may communicate, before receiving the one or more ranging communications, parameters for the ranging window wherein the parameters indicate to use the first link and not the second link for receiving the one or more ranging communications.

The transmission component 1104 may transmit an I2R message via a first spatial stream associated with the first link and using the first radio chain.

The transmission component 1104 may transmit an I2R message via a second spatial stream associated with the first link and using the second radio chain.

The reception component 1102 may receive a ranging NDP announcement.

The reception component 1102 may receive an R2I message via a first spatial stream associated with the first link and using the first radio chain.

The reception component 1102 may receive an R2I message via a second spatial stream associated with the first link and using the second radio chain.

The communication manager 1108 may identify the MU-RTS or BSRP as being associated with the first link or the second link independently, or in an absence of, the ranging poll received after the MU-RTS or BSRP.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a responding station (R-STA), comprising: transmitting a first ranging poll via a first bandwidth, the first ranging poll comprising an indication of a second ranging poll and first polling information transmitted with repetitions in a frequency domain based at least in part on serving first initiating stations (I-STAs) configured for communication using the first bandwidth and second I-STAs configured for communication using a second bandwidth that is smaller than the first bandwidth; and transmitting, based at least in part on the indication of the second ranging poll, the second ranging poll over the second bandwidth comprising second polling information.

Aspect 2: The method of Aspect 1, further comprising receiving one or more of: a first polling response to the first ranging poll from one or more of the first I-STAs; or a second polling response to the second ranging poll from one or more of the second I-STAs.

Aspect 3: The method of any of Aspects 1-2, wherein the first bandwidth is greater than 160 megahertz (MHz) and the second bandwidth is 160 MHz or less.

Aspect 4: The method of any of Aspects 1-3, wherein a first size of the first bandwidth and a second size of the second bandwidth are integer multiples of a bandwidth size of the repetitions of the first polling information.

Aspect 5: The method of any of Aspects 1-4, wherein transmitting the first ranging poll and transmitting the second ranging poll comprises: transmitting the first ranging poll and the second ranging poll within a single ranging window.

Aspect 6: The method of Aspect 5, wherein the single ranging window comprises resources for one or more of: a first measurement sounding phase, after the first ranging poll and before the second ranging poll, associated with the first I-STAs, a first measurement report phase, after the first ranging poll and before the second ranging poll, associated with the first I-STAs, a second measurement sounding phase, after the second ranging poll, associated with the second I-STAs, or a second measurement report phase, after the second ranging poll, associated with the second I-STAs.

Aspect 7: The method of any of Aspects 1-6, wherein transmitting the first ranging poll comprises: transmitting the first ranging poll as a non-high-throughput duplicate physical layer protocol data unit (PPDU).

Aspect 8: A method of wireless communication performed by an initiating station (I-STA), comprising: receiving a first ranging poll via a first bandwidth, the first ranging poll comprising an indication of a second ranging poll and first polling information transmitted with repetitions in a frequency domain based at least in part on a responding station (R-STA) serving first initiating stations (I-STAs) configured for communication using the first bandwidth and second I-STAs configured for communication using a second bandwidth that is smaller than the first bandwidth; and receiving, based at least in part on the indication of the second ranging poll, the second ranging poll over the second bandwidth comprising second polling information.

Aspect 9: The method of Aspect 8, further comprising transmitting one or more of: a first polling response to the first ranging poll from one or more of the first I-STAs; or a second polling response to the second ranging poll from one or more of the second I-STAs.

Aspect 10: The method of any of Aspects 8-9, wherein the first bandwidth is greater than 160 megahertz (MHz) and the second bandwidth is 160 MHz or less.

Aspect 11: The method of any of Aspects 8-10, wherein a first size of the first bandwidth and a second size of the second bandwidth are integer multiples of a bandwidth size of the repetitions of the first polling information.

Aspect 12: The method of any of Aspects 8-11, wherein receiving the first ranging poll and receiving the second ranging poll comprises: receiving the first ranging poll and the second ranging poll within a single ranging window.

Aspect 13: The method of Aspect 12, wherein the single ranging window comprises resources for one or more of: a first measurement sounding phase, after the first ranging poll and before the second ranging poll, associated with the first I-STAs, a first measurement report phase, after the first ranging poll and before the second ranging poll, associated with the first I-STAs, a second measurement sounding phase, after the second ranging poll, associated with the second I-STAs, or a second measurement report phase, after the second ranging poll, associated with the second I-STAs.

Aspect 14: The method of any of Aspects 8-13, wherein receiving the first ranging poll comprises: receiving the first ranging poll as a non-high-throughput duplicate physical layer protocol data unit (PPDU).

Aspect 15: A method of wireless communication performed by an initiating station (I-STA), comprising: establishing a first link with a responding station (R-STA) via a first radio chain and a second link with the R-STA via a second radio chain; and receiving one or more ranging communications of a ranging sequence, receiving the one or more ranging communications comprising: receiving, during a ranging window, the one or more ranging communications via the first link and not via the second link with the R-STA, receiving an MU-RTS or buffer status report poll (BSRP) with the one or more ranging communications, the MU-RTS or BSRP indicating resources for the one or more ranging communications associated with one or more of the first link or the second link during the ranging window, or receiving a ranging poll with the one or more ranging communications, the ranging poll indicating resources for the one or more ranging communications associated with one or more of the first link or the second link during the ranging window.

Aspect 16: The method of Aspect 15, further comprising: communicating with the R-STA, using the first link or the second link, based at least in part on the ranging sequence.

Aspect 17: The method of any of Aspects 15-16, wherein receiving the one or more ranging communications comprises receiving the one or more ranging communications via the first link and not via the second link, and wherein receiving the one or more ranging communications via the first link comprises tuning the first radio chain and the second radio chain to a the first link during a ranging window that is associated with the first link.

Aspect 18: The method of any of Aspects 15-17, further comprising: communicating, before receiving the one or more ranging communications, parameters for the ranging window, wherein the parameters indicate to use the first link and not the second link for receiving the one or more ranging communications.

Aspect 19: The method of any of Aspects 15-18, wherein receiving the one or more ranging communications comprises receiving the MU-RTS or BSRP with the one or more ranging communications, and wherein receiving the one or more ranging communications comprises receiving the one or more ranging communications via the first link or receiving the one or more ranging communications via the second link.

Aspect 20: The method of Aspect 19, further comprising: transmitting an initiator-to-responder (I2R) message via a first spatial stream associated with the first link and using the first radio chain; and transmitting an I2R message via a second spatial stream associated with the first link and using the second radio chain.

Aspect 21: The method of Aspect 19, further comprising: receiving a ranging null data packet (NDP) announcement; receiving a responder-to-initiator (R2I) message via a first spatial stream associated with the first link and using the first radio chain; and receiving an R2I message via a second spatial stream associated with the first link and using the second radio chain.

Aspect 22: The method of Aspect 19, further comprising: identifying the MU-RTS or BSRP as being associated with the first link or the second link independently, or in an absence of, the ranging poll received after the MU-RTS or BSRP.

Aspect 23: The method of any of Aspects 15-22, wherein receiving the one or more ranging communications comprises receiving the ranging poll that triggers the I-STA to switch to the first link based at least in part on the first link being the polled link and to transmit the clear-to-send-to-self message via the first link, and wherein receiving the one or more ranging communications comprises receiving the one or more ranging communications via the first link and receiving the one or more ranging communications via the second link.

Aspect 24: The method of Aspect 23, wherein, based at least in part on the ranging poll that triggers the I-STA to switch to the first link, the I-STA does not receive the MU-RTS or BSRP with the one or more ranging communications.

Aspect 25: An apparatus for wireless communication at a device, comprising a processor; memory coupled with the processor; and instructions stored in the memory and executable by the processor to cause the apparatus to perform the method of one or more of Aspects 1-24.

Aspect 26: A device for wireless communication, comprising a memory and one or more processors coupled to the memory, the one or more processors configured to perform the method of one or more of Aspects 1-24.

Aspect 27: An apparatus for wireless communication, comprising at least one means for performing the method of one or more of Aspects 1-24.

Aspect 28: A non-transitory computer-readable medium storing code for wireless communication, the code comprising instructions executable by a processor to perform the method of one or more of Aspects 1-24.

Aspect 29: A non-transitory computer-readable medium storing a set of instructions for wireless communication, the set of instructions comprising one or more instructions that, when executed by one or more processors of a device, cause the device to perform the method of one or more of Aspects 1-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having"

A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A responding station for wireless communication, comprising:
one or more memories; and
one or more processors, coupled to the one or more memories, configured to:
transmit a first ranging poll via a first bandwidth, the first ranging poll comprising an indication of a second ranging poll and first polling information transmitted with repetitions that repeat in a frequency domain based at least in part on serving first initiating stations (I-STAs) configured for communication using the first bandwidth and second I-STAs configured for communication using a second bandwidth that is smaller than the first bandwidth; and
transmit, based at least in part on the indication of the second ranging poll, the second ranging poll over the second bandwidth comprising second polling information.

2. The responding station of claim 1, wherein the one or more processors are further configured to receive one or more of:
a first polling response to the first ranging poll from one or more of the first I-STAs; or
a second polling response to the second ranging poll from one or more of the second I-STAs.

3. The responding station of claim 1, wherein the first bandwidth is greater than 160 megahertz (MHz) and the second bandwidth is 160 MHz or less.

4. The responding station of claim 1, wherein a first size of the first bandwidth and a second size of the second bandwidth are integer multiples of a bandwidth size of the repetitions of the first polling information.

5. The responding station of claim 1, wherein the one or more processors, to transmit the first ranging poll and transmitting the second ranging poll, are configured to:
transmit the first ranging poll and the second ranging poll within a single ranging window.

6. The responding station of claim 5, wherein the single ranging window comprises resources for one or more of:
a first measurement sounding phase, after the first ranging poll and before the second ranging poll, associated with the first I-STAs,
a first measurement report phase, after the first ranging poll and before the second ranging poll, associated with the first I-STAs,
a second measurement sounding phase, after the second ranging poll, associated with the second I-STAs, or
a second measurement report phase, after the second ranging poll, associated with the second I-STAs.

7. The responding station of claim 1, wherein the one or more processors, to transmit the first ranging poll, are configured to:
transmit the first ranging poll as a non-high-throughput duplicate physical layer protocol data unit (PPDU).

8. The responding station of claim 1, wherein each repetition of the first ranging poll is a non-HT duplicate physical layer (PHY) transmission.

9. An initiating station (I-STA) for wireless communication, comprising:

one or more memories; and
one or more processors, coupled to the one or more memories, configured to:
receive a first ranging poll via a first bandwidth, the first ranging poll comprising an indication of a second ranging poll and first polling information transmitted with repetitions that repeat in a frequency domain based at least in part on a responding station (R-STA) serving first I-STAs configured for communication using the first bandwidth and second I-STAs configured for communication using a second bandwidth that is smaller than the first bandwidth; and
receive, based at least in part on the indication of the second ranging poll, the second ranging poll over the second bandwidth comprising second polling information.

10. The initiating station of claim 9, wherein the one or more processors are further configured to transmit one or more of:
a first polling response to the first ranging poll from one or more of the first I-STAs; or
a second polling response to the second ranging poll from one or more of the second I-STAs.

11. The initiating station of claim 9, wherein the first bandwidth is greater than 160 megahertz (MHz) and the second bandwidth is 160 MHz or less.

12. The initiating station of claim 9, wherein a first size of the first bandwidth and a second size of the second bandwidth are integer multiples of a bandwidth size of the repetitions of the first polling information.

13. The initiating station of claim 9, wherein the one or more processors, to receive the first ranging poll and receiving the second ranging poll, are configured to:
receive the first ranging poll and the second ranging poll within a single ranging window.

14. The initiating station of claim 13, wherein the single ranging window comprises resources for one or more of:
a first measurement sounding phase, after the first ranging poll and before the second ranging poll, associated with the first I-STAs,
a first measurement report phase, after the first ranging poll and before the second ranging poll, associated with the first I-STAs,
a second measurement sounding phase, after the second ranging poll, associated with the second I-STAs, or
a second measurement report phase, after the second ranging poll, associated with the second I-STAs.

15. The initiating station of claim 9, wherein the one or more processors, to receive the first ranging poll, are configured to:
receive the first ranging poll as a non-high-throughput duplicate physical layer protocol data unit (PPDU).

16. A initiating station (I-STA) for wireless communication, comprising:
a memory; and
one or more processors, coupled to the memory, configured to:
establish a first link with a responding station (R-STA) via a first radio chain and a second link with the R-STA via a second radio chain;
receive one or more ranging communications of a ranging sequence, receiving the one or more ranging communications comprising:
receive, during a ranging window, the one or more ranging communications via the first link and not via the second link with the R-STA, receive a multi-user request-to-send (MU-RTS) or buffer status report poll (BSRP) with the one or more ranging communications, the MU-RTS or BSRP indicating resources for the one or more ranging communications associated with one or more of the first link or the second link during the ranging window, or receive a ranging poll with the one or more ranging communications, the ranging poll indicating resources for the one or more ranging communications associated with one or more of the first link or the second link during the ranging window; and communicate, before receiving the one or more ranging communications, parameters for the ranging window, wherein the parameters indicate to use the first link and not the second link for receiving the one or more ranging communications.

17. The initiating station of claim 16, wherein the one or more processors are further configured to:

communicate with the R-STA, using one or more of the first link or the second link, based at least in part on the ranging sequence.

18. The initiating station of claim 16, wherein the one or more processors, to receive the one or more ranging communications, are configured to receive the one or more ranging communications via the first link and not via the second link, and wherein the one or more processors, to receive the one or more ranging communications via the first link, are configured to the first radio chain and the second radio chain to the first link during a ranging window that is associated with the first link.

19. The initiating station of claim 16, wherein the one or more processors, to receive the one or more ranging communications, are configured to receive the MU-RTS or BSRP with the one or more ranging communications, and wherein the one or more processors, to receive the one or more ranging communications, are configured to receive the one or more ranging communications via the first link or receiving the one or more ranging communications via the second link.

20. The initiating station of claim 19, wherein the one or more processors are further configured to:

transmit an initiator-to-responder (I2R) message via a first spatial stream associated with the first link and using the first radio chain; and transmit an I2R message via a second spatial stream associated with the first link and using the second radio chain.

21. The initiating station of claim 19, wherein the one or more processors are further configured to:

receive a ranging null data packet (NDP) announcement;

receive a responder-to-initiator (R2I) message via a first spatial stream associated with the first link and using the first radio chain; and receive an R2I message via a second spatial stream associated with the first link and using the second radio chain.

22. The initiating station of claim 19, wherein the one or more processors are further configured to:

identify the MU-RTS or BSRP as being associated with the first link or the second link independently, or in an absence of, the ranging poll received after the MU-RTS or BSRP.

23. The initiating station of claim 16, wherein the one or more processors, to receive the one or more ranging communications, are configured to receive the ranging poll that triggers the I-STA to switch to the first link based at least in part on the first link being a polled link and to transmit the clear-to-send-to-self message via the first link, and wherein the one or more processors, to receive the one or more ranging communications, are configured to receive the one or more ranging communications via the first link and receiving the one or more ranging communications via the second link.

24. The initiating station of claim 23, wherein, based at least in part on the ranging poll that triggers the I-STA to switch to the first link, the I-STA does not receive the MU-RTS or BSRP with the one or more ranging communications.

25. A method of wireless communication performed by a responding station (R-STA), comprising:

transmitting a first ranging poll via a first bandwidth, the first ranging poll comprising an indication of a second ranging poll and first polling information transmitted with repetitions that repeat in a frequency domain based at least in part on serving first initiating stations (I-STAs) configured for communication using the first bandwidth and second I-STAs configured for communication using a second bandwidth that is smaller than the first bandwidth; and transmitting, based at least in part on the indication of the second ranging poll, the second ranging poll over the second bandwidth comprising second polling information.

26. The method of claim 25, further comprising receiving one or more of:

a first polling response to the first ranging poll from one or more of the first I-STAs; or a second polling response to the second ranging poll from one or more of the second I-STAs.

27. The method of claim 25, wherein the first bandwidth is greater than 160 megahertz (MHz) and the second bandwidth is 160 MHz or less.

28. The method of claim 25, wherein a first size of the first bandwidth and a second size of the second bandwidth are integer multiples of a bandwidth size of the repetitions of the first polling information.

29. The method of claim 25, wherein transmitting the first ranging poll and transmitting the second ranging poll comprises:

transmitting the first ranging poll and the second ranging poll within a single ranging window.

30. The method of claim 29, wherein the single ranging window comprises resources for one or more of:

a first measurement sounding phase, after the first ranging poll and before the second ranging poll, associated with the first I-STAs, a first measurement report phase, after the first ranging poll and before the second ranging poll, associated with the first I-STAs, a second measurement sounding phase, after the second ranging poll, associated with the second I-STAs, or a second measurement report phase, after the second ranging poll, associated with the second I-STAs.

* * * * *